(12) United States Patent
Mitamura et al.

(10) Patent No.: US 7,311,872 B2
(45) Date of Patent: Dec. 25, 2007

(54) POST CURE INFLATOR AND VULCANIZED TIRE COOLING METHOD

(75) Inventors: Hisashi Mitamura, Takasago (JP); Kazuto Okada, Kobe (JP); Akio Hakamada, Kobe (JP); Yutaka Yoshida, Kobe (JP)

(73) Assignees: Kobe Steel, Ltd., Kobe-shi (JP); Sumitomo Rubber Industries, Ltd., Kobe-shi (JP)

( * ) Notice: Subject to any disclaimer, the term of this patent is extended or adjusted under 35 U.S.C. 154(b) by 93 days.

(21) Appl. No.: 11/258,194

(22) Filed: Oct. 26, 2005

(65) Prior Publication Data

US 2006/0099285 A1 May 11, 2006

(30) Foreign Application Priority Data

Nov. 11, 2004 (JP) ............................. 2004-327584
Nov. 11, 2004 (JP) ............................. 2004-327585
Nov. 11, 2004 (JP) ............................. 2004-327586

(51) Int. Cl.
*B29C 35/16* (2006.01)
(52) U.S. Cl. .................................. 264/502; 425/58.1
(58) Field of Classification Search ................ 264/502, 264/237, 348; 425/58.1
See application file for complete search history.

(56) References Cited

U.S. PATENT DOCUMENTS

| | | | |
|---|---|---|---|
| 3,605,182 A | 9/1971 | Ulm | |
| 3,621,521 A | 11/1971 | Ulm | |
| 3,645,660 A * | 2/1972 | Hugger et al. | 425/58.1 |
| 3,667,881 A | 6/1972 | Cimprich | |
| 3,692,444 A * | 9/1972 | Hugger et al. | 425/58.1 |
| 3,792,145 A | 2/1974 | Hugger et al. | |
| 4,944,951 A * | 7/1990 | Katayama et al. | 425/58.1 |
| 5,198,234 A * | 3/1993 | Siegenthaler | 425/58.1 |
| 5,204,049 A * | 4/1993 | Siegenthaler | 425/58.1 |
| 5,250,252 A * | 10/1993 | Siegenthaler | 425/58.1 |
| 5,770,236 A | 6/1998 | Ureshino et al. | |
| 5,853,648 A | 12/1998 | Cleveland | |
| 6,214,280 B1 | 4/2001 | Delmoro | |

FOREIGN PATENT DOCUMENTS

| | | | |
|---|---|---|---|
| JP | 57-146642 | | 9/1982 |
| JP | 63-264307 | | 11/1988 |
| JP | 4-288206 | * | 10/1992 |
| JP | 5-31731 | * | 2/1993 |

* cited by examiner

*Primary Examiner*—James P. Mackey
(74) *Attorney, Agent, or Firm*—Oblon, Spivak, McClelland, Maier & Neustadt, P.C.

(57) ABSTRACT

A post cure inflator for expansion-cooling a vulcanized tire is provided with a vulcanized-tire holding mechanism for holding the vulcanized tire and a rotating mechanism for rotating the vulcanized tire at a high speed via the vulcanized-tire holding mechanism such that a forced convection becomes more dominant than a natural convection in an air flow around the vulcanized tire.

30 Claims, 15 Drawing Sheets

MAXIMUM VELOCITY 0.3m/sec

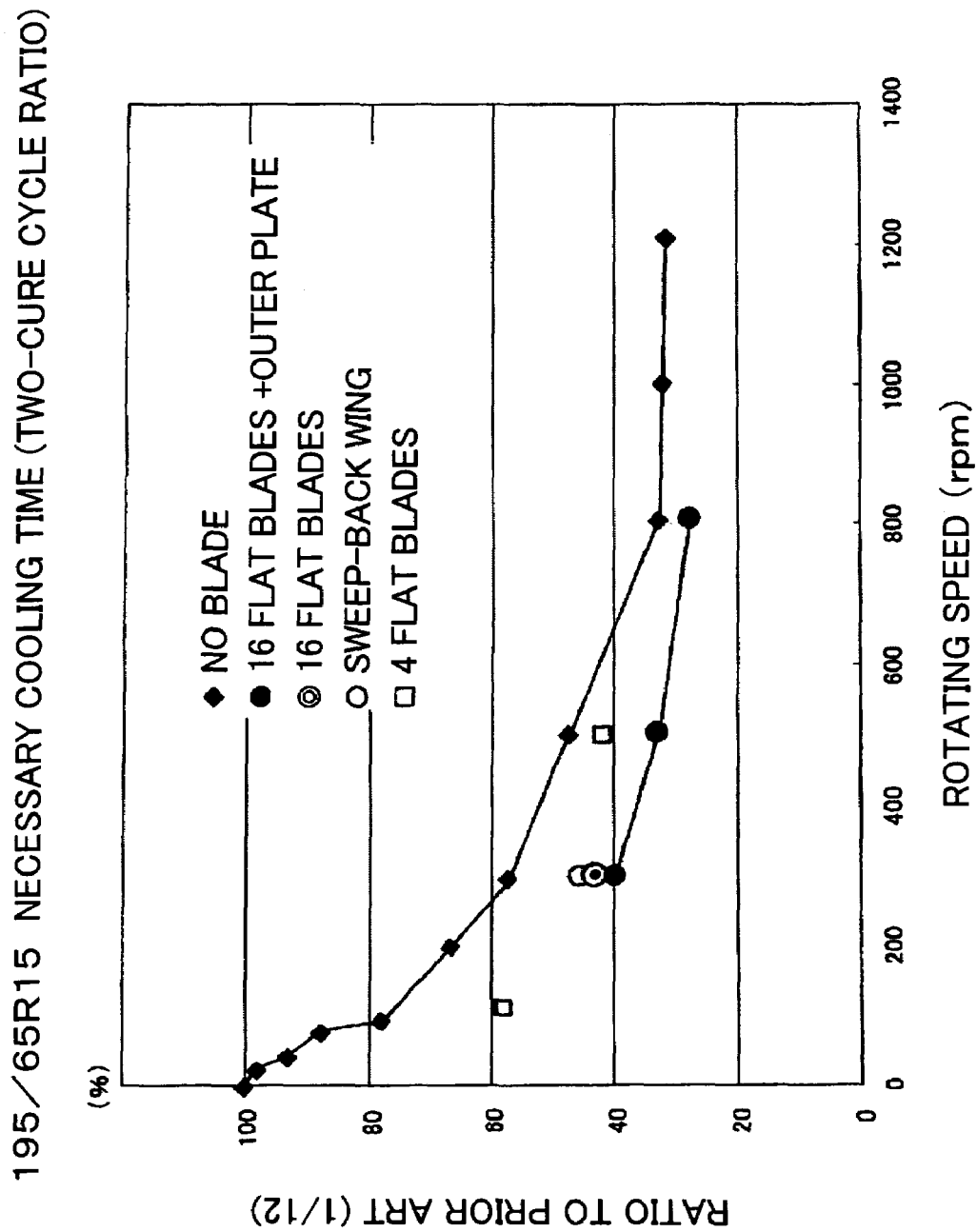

POST CURE INFLATOR AND VULCANIZED TIRE COOLING METHOD

BACKGROUND OF THE INVENTION

1. Field of the Invention

The present invention relates to a post cure inflator for expansion-cooling a vulcanized tire and a vulcanized tire cooling method.

2. Description of the Related Art

Generally, organic fibers of polyester, nylon or like material are used as carcass members as reinforcing fibers inside a tire. In the process of cooling a tire after completing the vulcanization, these reinforcing fibers are contracted. However, the degree of contraction is not uniform due to disparities, arrangement, molded state and the like of the members. In the natural cooling by merely leaving the tire, the tire is deformed due to differences in the degree of contraction, which makes the tire a defective product or deteriorates the uniformity performance of the tire.

Accordingly, air is normally filled into the inside of the tire by a post cure inflator after the vulcanization is completed, and the tire is cooled up to a certain temperature or lower (normally 100° C. or lower, desirably 80° C. or lower) at which the contraction of the reinforcing fibers stops while holding the tire in a proper shape (see, for example, Japanese Unexamined Patent Publication No. H06-143298, hereinafter, referred to as "Prior Art 1").

A post cure inflator of the so-called two-point type having two upper and lower positions for cooling a tire and moving the tire between two handling positions by holding the tire and reversing it has been proposed and put to practical use as a post cure inflator of this type (see, for example, Japanese Unexamined Patent Publication No. H11-320564, hereinafter, referred to as "Prior Art 2").

In recent years, it has been required to shorten the tire cooling time in order to cope with a shortened vulcanization time, and post cure inflators having various constructions for shortening the tire cooling time have been proposed and put to practical use. For example, Japanese Unexamined Patent Publication No. 2002-307444 (hereinafter, referred to as "Prior Art 3") proposes a post cure inflator in which a hollow passage is formed in a rim mechanism for holding a bead portion of a tire, cooling air is supplied into and caused to flow along this hollow passage, and air or atomized water is sprayed on the outer surface of the tire, thereby forcibly cooling the tire to complete the cooling within a short period of time.

However, in the case of the post cure inflator of Prior Art 1, there is a problem of requiring a loner time to cool the vulcanized tire. Further, temperature at an upper part of the vulcanized tire tends to be higher by being influenced, for example, by a natural convection, one surface of the vulcanized tire facing a vulcanizer tends to be higher due to an asymmetric temperature environment around the facility, and the peripheral temperatures of the tires vary due to the asymmetric specification such as the pattern, construction and the material of the tires. Thus, the vulcanized tire cannot be cooled in a well-balanced manner along vertical directional and circumferential direction. The temperature difference caused by the cooling variation causes a problem of varying qualities such as conicity.

In the case of the post cure inflator of Prior Art 2, it is difficult to uniformly cool the entire outer surface of the tire, causing temperature irregularity and cooling irregularity along circumferential direction outside the tire. There are other problems of a complicated mechanism, a high equipment cost, and high maintenance frequency and cost.

In the post cure inflator for forcibly cooling the tire using the cooling medium such as cooling air or atomized water as disclosed in Prior Art 3, stains such as water marks are likely to attach at positions where the cooling medium such as water is sprayed, thereby causing a problem in the appearance of the outer surface of the tire. Further, since a mechanism including a driving source and a pipe for supplying the cooling medium needs to be installed around the apparatus, the apparatus is enlarged and the mechanism becomes complicated by these peripheral equipments and the parts cost is increased by installing the peripheral equipments. There is an additional problem of a considerable increase in the running cost by the operation of the driving source.

SUMMARY OF THE INVENTION

It is an object of the present invention to provide a technology which is free from the problems residing in the prior art.

According to an aspect of the invention, a post cure inflator is provided with a vulcanized-tire holding mechanism for holding a vulcanized tire, and a rotating mechanism for rotating the vulcanized tire. The vulcanized tire is cooled by air flowing outside of the vulcanized tire.

The qualities of a completed tire is improved by suitably cooling the vulcanized tire within a short period of time. The vulcanized tire can be properly cooled without increasing the size of an apparatus, complicating mechanisms and leading to considerable increases in the parts cost and the running cost.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 11 is a diagram showing a simulation result of the air flows by the inventive post cure inflator;

FIG. 15 is a graph showing necessary cooling times; and

DETAILED DESCRIPTION OF THE PREFERRED EMBODIEMNTS OF THE INVENTION

Hereinafter, a post cure inflator (PCI) and a vulcanized tire cooling method according to embodiments of the present invention are described with reference to the accompanying drawings.

First Embodiment

Figure 1:
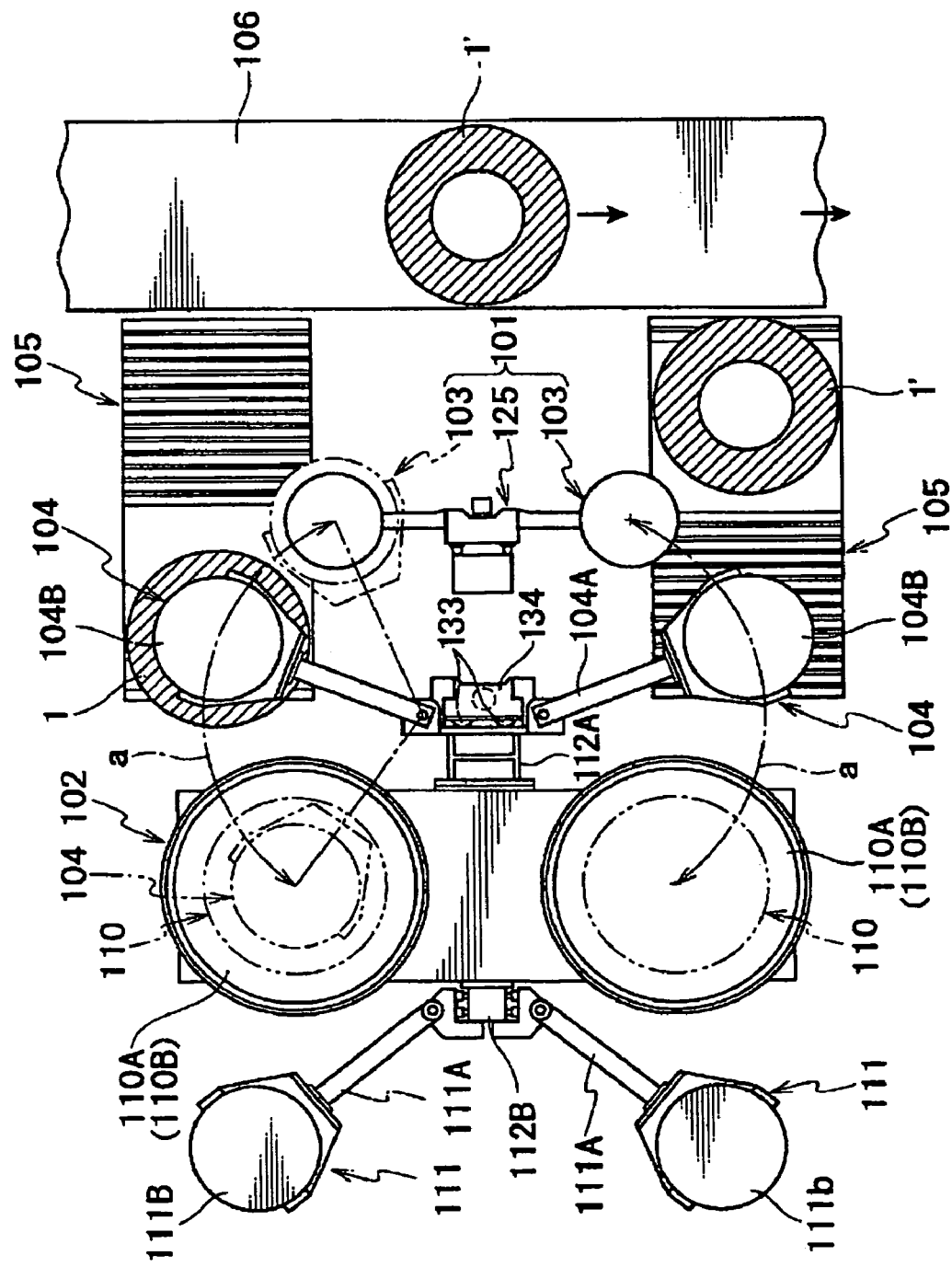
FIG. 1 is a plan view showing an arrangement layout of a tire vulcanizer and a post cure inflator embodying the present invention.
Figure 2:
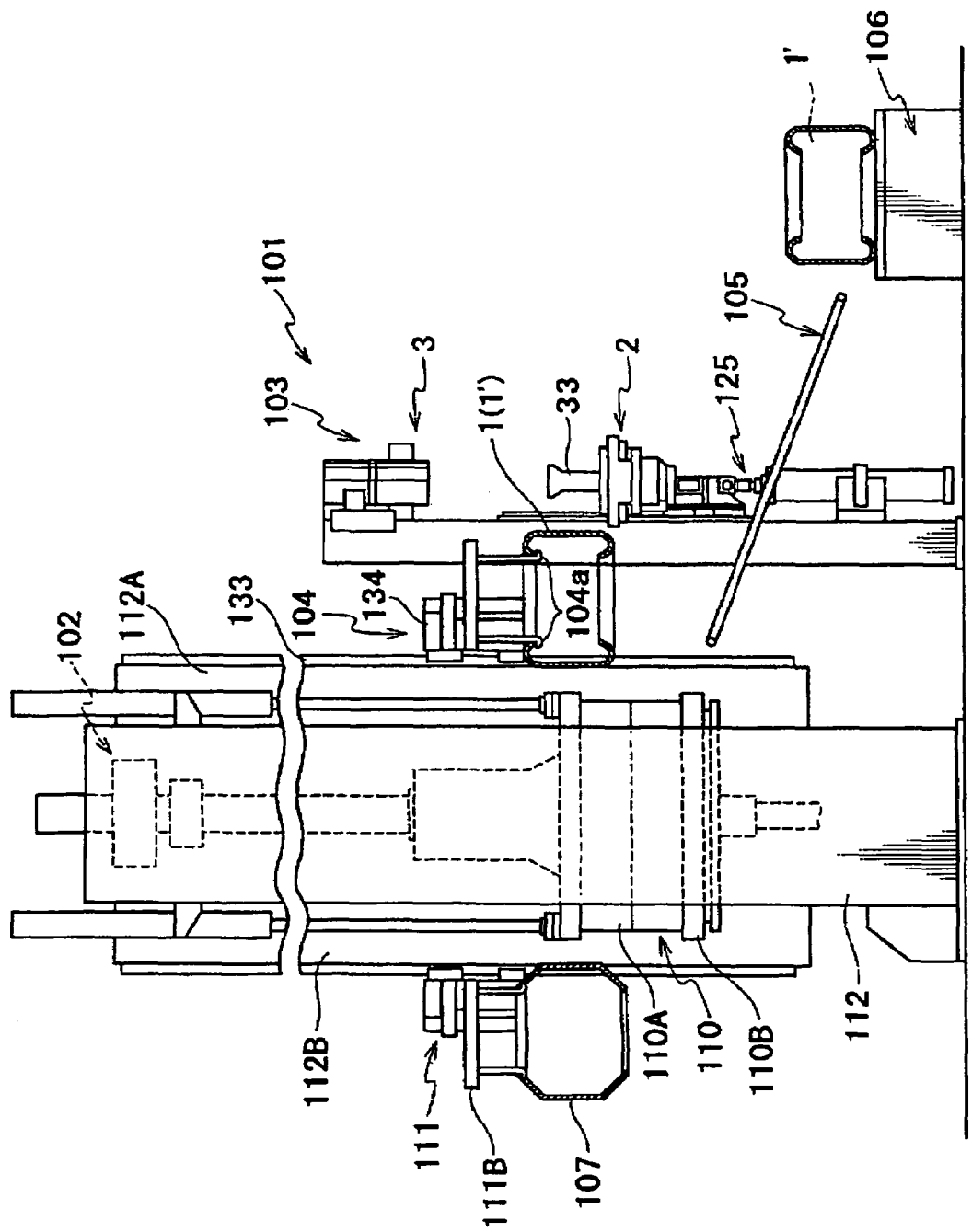
FIG. 2 is a front view showing the arrangement layout of the tire vulcanizer and the post cure inflator.

Referring to FIGS. 1 and 2 showing an arrangement layout of a post cure inflator and a tire vulcanizer which embodies the present invention, a post cure inflator 101 is installed at a specified distance from the rear surface (right side in FIGS. 1 and 2) of a vulcanizer 102. The post cure inflator 101 includes expansion-cooling units 103 for expansion-cooling a tire 1. The number of the expansion-cooling units 103 is set to be equal to the number of molds of the vulcanizer 102. Specifically, the post cure inflator 101 includes two expansion-cooling units 103 arranged in parallel, and a lower rim elevating mechanism 125 for simultaneously elevating lower rim mechanisms 2 of both expansion-cooling units 103, and is so constructed as to be able to simultaneously expansion-cool two vulcanized tires 1 upon simultaneously receiving from the vulcanizer 102. It should be noted that the expansion-cooling units 103 are described in detail later.

The vulcanizer 102 installed in parallel with the post cure inflator 101 is a tandem type pressing apparatus for simultaneously vulcanizing two green tires 107 (raw tires). Specifically, the vulcanizer 102 is provided with two molds 110 for vulcanizing the respective green tires 107, two carry-in loaders 111 for carrying the green tires 107 into the respective molds 110 from the front side of the pressing apparatus, and two rotary loaders 104 for carrying the vulcanized tires 1 out from the respective molds 110 and conveying them to the post cure inflator 101. The vulcanizer 102 may be provided with only one, three or more molds 110. In these cases, the post cure inflator 101 is provided with one, three or more expansion-cooling units 103 in correspondence with the number of the molds of the vulcanizer 102.

Each mold 110 includes an upper mold part 110A and a lower mold part 110B relatively movable along vertical direction to close and open the mold 110. The upper mold part 110A is elevated by an elevating cylinder with respect to the lower mold part 110B fixed at a lower part of a vulcanizer frame 112. Each carry-in loader 111 is so provided on a guide column 112B as to move up and down and rotate. The guide column 112B stands at a middle position of the front side (left side in FIGS. 1 and 2) of the vulcanizer frame 112. The green tire 107 is conveyed to between the respective mold parts 110A, 110B by a rotary movement by having an upper bead portion thereof gripped by a tire chuck 111B at the leading end of a rotary arm 111A.

The respective rotary loaders 104 are arranged on a rear center frame 112A of the vulcanizer frame 112. Each rotary loader 104 is rotatably mounted while having its center axis of rotation located on a guiding mount 134 (supporting portion) for moving a guide rail 133 arranged along the rear center frame 112A upward and downward, and includes a rotary arm 104A and a tire chuck 104B. The rotary arm 104A is rotatably supported on the guiding mount 134 and rotates the tire chuck 104B between the vulcanizer 102 and the post cure inflator 101 by a plurality of unillustrated fluid cylinders. The tire chuck 104B is constructed by circumferentially arranging three or more claws 104a at even intervals, the claws 104a being simultaneously movable to extend or shorten the diameter of the tire chuck 104B. The respective claws 104 are moved to extend the diameter of the tire chuck 104B after being inserted into the vulcanized tire 1 or the cooled tire 1' in a diameter reducing state, thereby gripping the upper bead portion. The tire 1 or 1' is released by moving the respective claws 104a again to shorten the diameter of the tire chuck 104B.

A discharge conveyor 105 is arranged on a rotational path "a" of each rotary arm 104A. The discharge conveyor 105 is a roller conveyor comprised of a plurality of rollers, and is located below the rotary loader 104. In addition, the discharge conveyor 105 is located in proximity to the outer side of the expansion-cooling unit 103, whereby the expansion-cooling unit 103 and the discharge conveyor 105 are arranged side by side along forward and backward directions. The respective discharge conveyors 105 are inclined downward from the vulcanizer 102 toward a carry-out conveyor 106 so as not to hinder upward and downward movements of the lower rim mechanisms 2, wherein the cooled tires 1' are gravitationally conveyed onto the carry-out conveyor 106. The carry-out conveyor 106 is a belt conveyor and arranged behind and at a specified distance from the post cure inflator 101 for conveying the cooled tires 1' transferred from the respective discharge conveyors 105 to a tire checking process as a post process or a shipping site.

Figure 3:
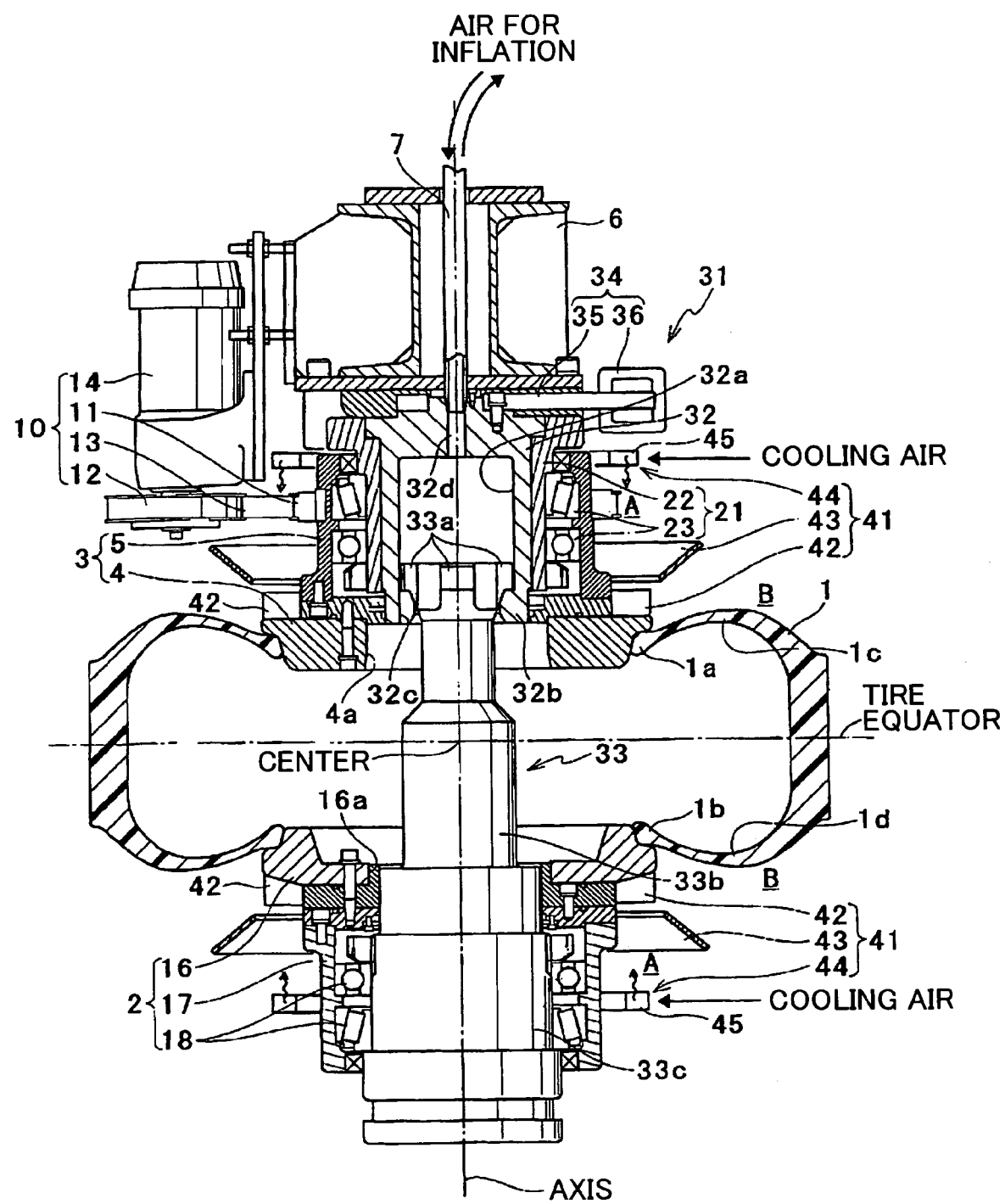
FIG. 3 is a schematic construction diagram in vertical section showing the post cure inflator.

Each expansion-cooling unit 103 of the post cure inflator 101 includes a vulcanized-tire holding mechanism 2 (hereinafter, "lower rim mechanism 2") for holding the lower surface of the horizontally placed vulcanized tire 1 and a vulcanized-tire holding mechanism 3 (hereinafter, "upper rim mechanism 3") for holding the upper surface of the vulcanized tire 1 as shown in FIG. 3. The upper rim mechanism 3 includes an upper rim 4 for hermetically holding an upper bead portion 1a of the vulcanized tire 1 and an upper rim coupling member 5 coupled to the upper rim 4. The vulcanized tire 1 is formed to have a symmetric shape with respect to an axial center point, and the equator of the vulcanized tire is defined to be a line of intersection of a plane passing the axial center point and normal to the axial direction and the circumferential surface of the vulcanized tire 1.

The upper rim 4 has a disk shape having an outer diameter corresponding to the diameter of the upper bead portion 1a. An opening 4a used to introduce a locking shaft 33 to be described later is formed at a radially inner side of the upper rim 4. The upper rim coupling member 5 is secured to the upper surface of the upper rim 4. The upper rim coupling member 5 is formed to have a round tubular shape so as to surround the opening 4a, and is arranged such that the center axis thereof coincides with the vertical center axis of the upper rim 4.

The upper rim mechanism 3 constructed as above is rotatable in an arbitrary direction at an arbitrary speed by a rotating mechanism 10. The rotating mechanism 10 includes a driven pulley 11 horizontally secured to the outer circumferential surface of the rotating mechanism 10, a drive pulley 12 arranged at a side of the driven pulley 11, a drive belt 13 mounted on the driven pulley 11 and the drive pulley 12, and a tire driving motor 14 coupled to the drive pulley 12. The rotating mechanism 10 transmits a torque of the tire driving motor 14 to the driven pulley 11 via the drive pulley 12 and the drive belt 13, thereby rotating the upper rim coupling member 5 and the upper rim 4 to rotate the vulcanized tire 1 held by the upper rim 4 at a high speed.

Here, the "high-speed rotation" means the rotation at such a speed that a forced convection becomes more dominant than a natural convection in an air flow around the vulcanized tire 1. Specifically, this is a rotating speed of the vulcanized tire 1 of 100 rpm or faster. The rotating speed of the "high-speed rotation" is sufficient to be 100 rpm or faster, but preferably 200 rpm or faster, more preferably 300 rpm or faster and preferably 1000 rpm or slower, more preferably 800 rpm or slower. The upper limit is set here because the cooling effect (necessary cooling time) does not change very much and, rather, a reduction in the durability of the equipment becomes eminent if the rotating speed is excessively increased. Further, considerable equipment costs and labor are necessary to ensure safety. In the case of providing blades, the same effects as those obtained when the rotating speed is 800 to 1000 rpm can be obtained even at a rotating speed of 500 rpm or slower.

The rotating mechanism 10 rotates the vulcanized tire 1 at a high speed such that the forced convection becomes more dominant than the natural convection in the air flow around the vulcanized tire 1, thereby actively removing the heat of the vulcanized tire 1 by the forced convection. As a result, the vulcanized tire 1 can be cooled to a specified temperature or lower within a short period of time. Further, by creating the above forced convection as an air flow symmetric at the opposite axial sides with respect to the equator of the vulcanized tire 1, the vulcanized tire 1 can be symmetrically cooled at the opposite axial sides with respect to the equator. As a result, qualities after the expansion cooling, particularly uniformity can be improved. In other words, the post cure inflator is so constructed as to rotate the vulcanized tire 1 at a high speed so that physical property values become symmetric at the opposite axial sides with respect to the equator of the vulcanized tire 1, whereby the vulcanized tire can be expansion-cooled while the air outside the vulcanized tire 1 is caused to flow such that the forced convection becomes more dominant than the natural convection. Here, the "physical property values" mean that of at least one of physical elements such as hardness, tensile strength, elongation, pure rubber strength, impact resiliency, tearing strength, compression set, abrasion resistance, flex-crack resistance and in-process extensibility of the carcass cords, but does not necessary mean the physical property values of all the physical elements.

As shown in FIG. 3, an upper rim supporting mechanism 21 for rotatably supporting the upper rim mechanism 3 and a locking mechanism 31 for detachably coupling the upper rim mechanism 3 and the lower rim mechanism 2 are arranged in this order inside the upper rim coupling member 5 of the upper rim mechanism 3. The upper rim supporting mechanism 21 includes a tubular supporting member 22 in the form of a round tube arranged along the inner circumferential surface of the upper rim coupling member 5, and a bearing member 23 arranged between the tubular supporting member 22 and the upper rim coupling member 5. The tubular supporting member 22 has its upper end secured to a horizontal frame 6. The horizontal frame 6 constructs a part of an unillustrated frame mechanism for holding the post cure inflator in a specified posture. On the other hand, the bearing member 23 couples the tubular supporting member 22 and the upper rim coupling member 5 to fix them with respect to vertical direction, and supports them in such a manner as to be horizontally rotatable. Thus, the upper rim supporting mechanism 21 rotatably supports the upper rim mechanism 3 at a specified height position by being supported on the horizontal frame 6.

The locking mechanism 31 is provided at the radially inner side of the upper rim supporting mechanism 21. The locking mechanism 31 includes a locking member 32, the locking shaft 33 and a rotary mechanism 34 for locking. The locking member 32 is rotatably fitted in the tubular supporting member 22 of the upper rim supporting mechanism 21. The leading end of a rotary shaft 35 is rotatably coupled to the upper surface of the locking member 32. The rotary shaft 35 is horizontally placed, and the rear end thereof is coupled to a cylinder device 36 such as an air cylinder or a hydraulic cylinder. The rotary shaft 35 and the cylinder device 36 construct the rotary mechanism 34 for locking, which can rotate the locking member 32 in forward and reverse directions by rotating the rotary shaft 35 by means of the cylinder device 36.

The locking member 32 rotatable by the rotary mechanism 34 has a recessed portion 32*a* having an open bottom end. An air hole 32*d* is formed in the center of the ceiling surface of the recessed portion 32*a*, and is connected with an air pipe 7 after vertically penetrating an upper wall portion of the locking member 32. The air pipe 7 is connected with an unillustrated air supplying device, which includes an air supplying mechanism for supplying air for inflation into the vulcanized tire 1 to inflate the vulcanized tire 1 by an inner pressure and an air replacing mechanism for replacing the air for inflation, for example, during the rotation of the vulcanized tire 1.

Latching portions 32*b* project radially inward from four positions of the side wall surfaces at the bottom end of the recessed portion 32*a*, and insertion grooves 32*c* (notches) are formed between adjacent latching portions 32*b*. The insertion grooves 32*c* are so formed as to pass projecting portions 33*a* of the locking shaft 33. The locking mechanism 31 thus constructed brings the projecting portions 33*a* of the locking shaft 33 and the insertion grooves 32 into alignment with respect to vertical direction by rotating the locking member 32, for example, in forward direction by means of the rotary mechanism 34, whereby the projecting portions 33*a* of the locking shaft 33 are made free to enter and exit the recessed portion 32*a*. On the other hand, the locking mechanism 31 brings the projecting portions 33*a* of the locking shaft 33 and the latching portions 32*b* into alignment with respect to vertical direction by rotating the locking member 32, for example, in reverse direction, whereby the projecting portions 33*a* of the locking shaft 33 can be fixed in the recessed portion 32*a*.

The above projecting portions 33*a* are so arranged as to project radially outward at four positions of the upper end of the locking shaft 33. Further, the locking shaft 33 is arranged such that the axis thereof coincides with the center axis of the above lower rim mechanism 2, and includes a shaft portion 33*b* extending down from the upper end, and a shaft supporting portion 33*c* formed at the bottom end of the shaft portion 33*b*.

The lower rim mechanism 2 is rotatably mounted on the shaft supporting portion 33*c*. The lower rim mechanism 2 includes a lower rim 16 for hermetically holding a lower bead portion 1*b* of the vulcanized tire 1, a lower rim supporting member 17 coupled to the lower rim 16, and a lower rim coupling mechanism 18 rotatably coupling the lower rim supporting member 17 to the shaft supporting portion 33*c* of the locking shaft 33.

The lower rim 16 has a disk shape having an outer diameter corresponding to the diameter of the lower bead portion 1b. An opening 16a used to introduce the aforementioned locking shaft 33 is formed at a radially inner side of the lower rim 16. A lower rim supporting member 17 is secured to the lower surface of the lower rim 16. The lower rim supporting member 17 is formed to have a round tubular shape so as to surround the opening 16a, and is arranged such that the center axis thereof coincides with that of the lower rim 16. A lower rim coupling mechanism 18 including a bearing portion is provided on the inner circumferential surface of the lower rim supporting member 17. The lower rim mechanism 2 thus constructed rotatably supports the vulcanized tire 1 relative to the locking shaft 33 by being driven by the rotation of the upper rim mechanism 3 while holding the lower bead portion 1b of the vulcanized tire 1.

The bottom end of the locking shaft 33 is coupled to an unillustrated elevating mechanism, which makes the locking shaft 33 movable upward and downward between an unillustrated tire placing position and a tire mounting position located higher than the shown position. At the tire placing position, the vulcanized tire 1 is attached to and detached from the lower rim mechanism 2. On the other hand, at the tire mounting position, the upper bead portion 1a of the vulcanized tire 1 is held by the upper rim mechanism 3 and the cooling is performed while holding the vulcanized tire 1 by the lower and upper rim mechanisms 2, 3.

The cooling is performed also by an air remover or air removing mechanism 41 in addition to by the rotation of the vulcanized tire 1 by means of the rotating mechanism 10. The air removing mechanism 41 is so constructed as to forcibly remove the air present near side wall portions 1c, 1d, which are side surface portions of the vulcanized tire 1, utilizing the rotation by the rotating mechanism 10.

Figure 4:
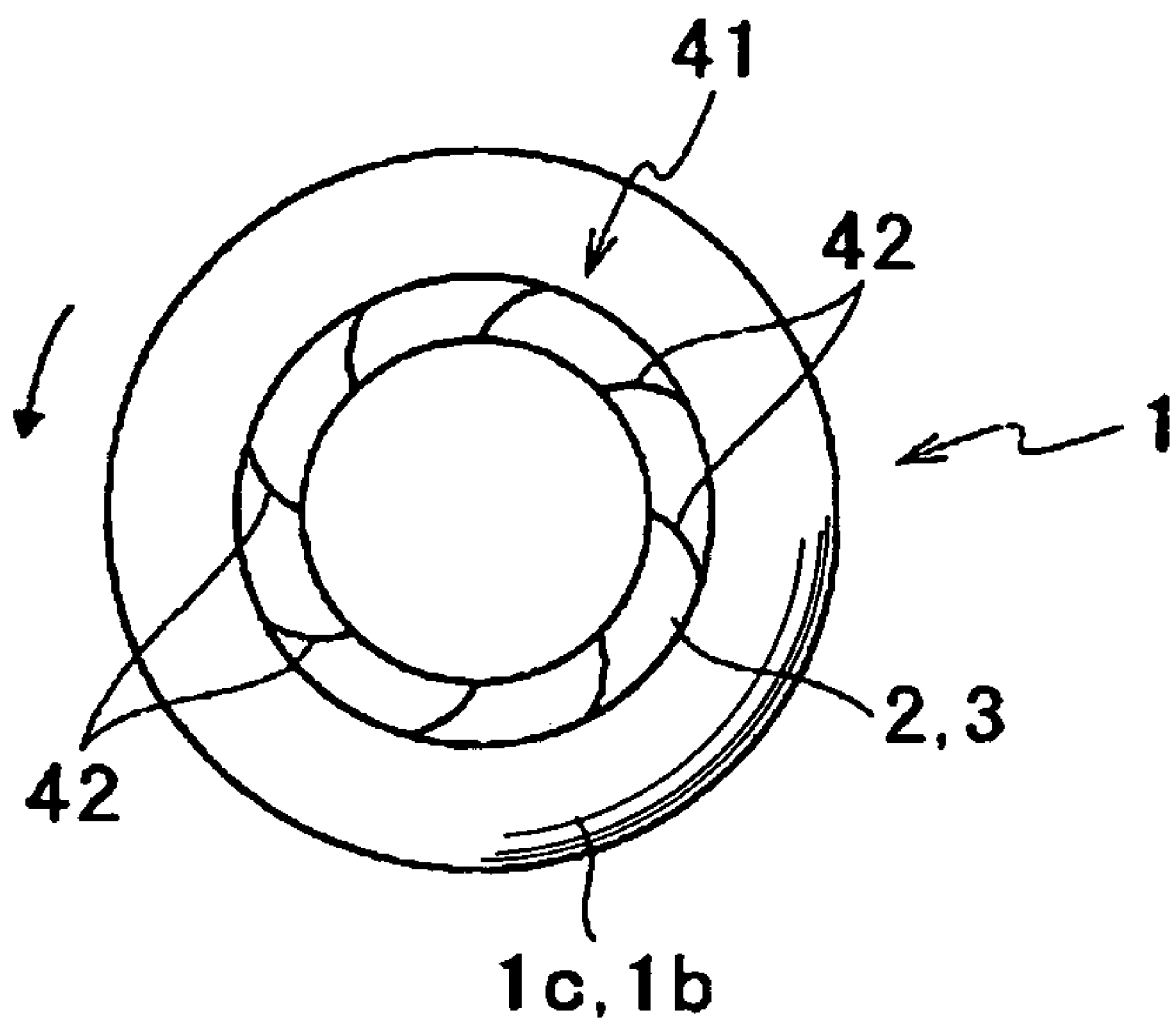
FIG. 4 is a diagram showing an arranged state of blade members.

Specifically, the air removing mechanism 41 is constructed to create an air flow including components in directions along the side surface portions 1c, 1d of the vulcanized tire 1 and those in radial directions by rotating together with the rim mechanisms 2, 3. Specifically, the air removing mechanism 41 is provided with a plurality of blade members 42 which are disposed on the respective upper and lower rim mechanisms 3, 2 and to which a torque from the rotating mechanism 10 is transmitted. These blade members 42 are arranged at even intervals along the circumferential direction of the outer periphery of each of the rim mechanisms 3, 2 as shown in FIG. 4. The blade members 42 are in the form of plates curved substantially at the same radius of curvature as the outer circumferential surfaces of the respective rim mechanisms 3, 2, and are oblique to the radial directions of the rim mechanisms 3, 2. In other words, each blade member 42 is the so-called sweep-back wing inclined such that a radially inner end is located more upstream than a radially outer end with respect to rotating direction (direction of arrow in FIG. 4). Thus, the air removing mechanism 41 creates the air flow containing components in the directions along the side surface portions of the vulcanized tire 1 and those in radially outward directions without reducing a relative circumferential speed by the rotation of the blade members 42 together with the rim mechanisms 3, 2. It should be noted that this air removing mechanism 41 can have the shape of a centrifugal fan similar to a multiblade centrifugal fan. The blade members 42 may not necessary rotate together with the rim mechanisms, but may rotate relative to the rim mechanisms.

At sides of the upper and lower blade members 42 opposite from the tire 1, partitioning members 43 are provided as parts of the air removing mechanism 41. The partitioning member 43 partitions areas of the tire 1 at the sides of the side wall portions 1c, 1d into first spatial areas A at air inflow sides toward the blade members 42 and second spatial areas B near the side wall portions 1c, 1d of the vulcanized tire 1. Specifically, the partitioning member 43 is arranged such that the outer periphery thereof at a side toward the blade members 42 (one side) is proximate to the outer peripheries of the blade members 42 and the inner diameter thereof at one side is smaller than the one at the other side. In this way, the partitioning member 43 prevents the air present in the second spatial area B from flowing into the first spatial area A and causes a large quantity of air to flow toward the blade members 42 by collecting the air present in the first spatial area A before a heat exchange.

A part of the torque of the rotating mechanism 10 may be transmitted to the blade members 42 or a torque of a driving mechanism provided in addition to the rotating mechanism 10 may be transmitted to the blade members 42. Since the phases of the tire 1 and the blade members 42 change along rotating direction by the relative rotation, there is an effect of more uniformly removing the air along the circumferential direction of the tire 1. In the case of providing the driving mechanism(s) in addition to the rotating mechanism 10 to transmit the torque to the blade members 42, the blade members to which torques are transmitted from the different driving mechanisms can be provided at the upper and lower sides of the vulcanized tire 1. Alternatively, a driving mechanism for transmitting a torque only to the blade members 42 above the vulcanized tire 1 may be provided in addition to the rotating mechanism 10. In this way, the cooling ability for the vulcanized tire 1 can be adjusted at the upper and lower parts of the vulcanized tire 1. In other words, a more precise adjustment can be made for a temperature difference between the upper and lower parts of the vulcanized tire 1. Accordingly, even if the temperature of the upper part of the vulcanized tire 1 tends to be higher due to the influence of the asymmetry of the temperature around the equipment or the cooling rate is biased due to the asymmetry of the upper and lower parts of the vulcanized tire 1 (e.g., the shapes of the side wall portions 1c, 1d differ), the cooling rates of the upper and lower parts can be conformed. The cooling abilities at the upper and lower parts of the vulcanized tire 1 can be individually changed by changing the shape of the blade members 42 provided at the upper side of the vulcanized tire 1 from that of the blade members 42 provided at the lower side or changing the number of the blade members 42 at the upper and lower sides.

At sides of the upper and lower partitioning members 43 opposite from the tire 1, cooling air supplying mechanisms 44 are provided as parts of the air removing mechanisms 41. Each cooling air supplying mechanism 41 includes an annular pipe 45 formed and arranged to surround the upper or lower rim coupling member 5 or 17 of the rim mechanism 3 or 2, an unillustrated cooling air supplying device for supplying the cooling air to the annular pipe 45, and an unillustrated nozzle provided on the annular pipe 45 for jetting out the cooling air toward the blade members 42. It should be noted that the nozzle may be a through hole formed in the annular pipe 45.

Next, the operation of the post cure inflator 101 having the above construction is described.

As shown in FIGS. 1 and 2, upon the completion of the vulcanization by the vulcanizer 102, the respective rotary loaders 104 are moved upward and rotated to position the tire chucks 104B within the respective molds 110. Subsequently, the tire chucks 104B are lowered to grip the vulcanized tires 1. Then, the tire chucks 104B are moved upward and rotated to convey the vulcanized tires 1 from the respective molds 110 to the respective expansion-cooling units 103 of the post cure inflator 101. At the unillustrated tire placing positions reached by lowering the lower rim mechanisms 2 to their lower limit positions, the respective loaders 104 are moved upward and rotated to retract from the corresponding expansion-cooling units 103 after the vulcanized tires 1 are placed on the respective lower rim mechanisms 2 by lowering the respective rotary loaders 104.

When the vulcanized tires 1 are placed on the lower rim mechanisms 2 as above, the lower bead portions 1$b$ of the vulcanized tires 1 are held by the lower rims 16 of the lower rim mechanisms 2 as shown in FIG. 3. Thereafter, the locking shafts 33 are moved upward, thereby moving the lower rim mechanisms 2 and the vulcanized tires 1 upward. At this time, the locking members 32 are rotated in forward direction by the rotating mechanisms 34 in the locking mechanisms 31, whereby the projecting portions 33$a$ of the locking shafts 33 and the insertion grooves 32$c$ of the locking members 32 are aligned with respect to vertical direction. Accordingly, the locking shafts 33 moving upward enter the recessed portions 32$a$ upon the passage of the projecting portions 33$a$ through the insertion grooves 32$c$. When the locking shafts 33 reach the tire mounting positions as the upper limit positions, the elevation of the locking shafts 33 are stopped and the upper bead portions 1$a$ of the vulcanized tires 1 are hermetically held by the upper rims 4 of the upper rim mechanisms 3.

Thereafter, the locking members 32 are rotated in reverse direction in the locking mechanisms 31, and the latching portions 32$b$ are aligned with the projecting portions 33$a$ of the locking shafts 33 with respect to vertical direction. Subsequently, the air supplying mechanism of the unillustrated air supplying device is operated to supply the air for inflation into the vulcanized tires 1 at a specified pressure via the air pipes 7 and the like. As a result, the projecting portions 33$a$ of the locking shafts 33 are fixed with respect to vertical direction by the latching portions 32$b$ in the recessed portions 32$a$, whereby the upper rim mechanisms 3 and lower rim mechanisms 2 are fixed at a specified distance from each other via the locking shafts 33, and the vulcanized tires 1 are inflated and held in a specified shape.

Thereafter, the air replacing mechanism of the air supplying device is suitably operated to replace the air for inflation while keeping the pressure in the vulcanized tires 1 at a constant level. As a result, the air for inflation having reached a high temperature by the heat exchange with the vulcanized tires 1 is discharged, whereas low-temperature air for inflation before the heat exchange is supplied into the vulcanized tires 1. Therefore, the cooling can be efficiently performed from the insides of the vulcanized tires 1.

Further, the tire driving motors 14 are operated in the rotating mechanisms 10, and the upper rim mechanisms 3 are rotated via the drive pulleys 12, the drive belts 13 and the driven pulleys 11, thereby rotating the vulcanized tires 1 held by the upper rim mechanisms 3 at a high speed. As a result, the forced convections become more dominant than the natural convections in the air flows around the vulcanized tires 1, whereby the heat quantities of the vulcanized tires 1 can be actively removed by the forced conventions. In this way, the vulcanized tires 1 can be cooled to a specified temperature or lower within a shorter period of time as compared to a case where the vulcanized tires 1 are expansion-cooled in a stationary state or the vulcanized tires 1 are expansion-cooled while being rotated at a low speed at which the natural convections are more dominant.

Further, since each vulcanized tire 1 is symmetrically shaped with respect to the axial center position thereof, the forced convection created by the high-speed rotation of the vulcanized tire 1 is an air flow symmetric at the opposite axial sides with respect to the equator of the vulcanized tire 1, i.e., the line of intersection of the plane passing the axial center point and normal to the axial direction and the circumferential surface of the vulcanized tire 1. Thus, the vulcanized tire 1 can be symmetrically cooled at the opposite axial sides with respect to the tire equator, thereby improving the qualities after the expansion cooling, particularly uniformity.

When the respective side wall portions 1$c$, 1$d$ are moved relative to the surrounding air by the rotation of the vulcanized tire 1, an air flow distribution in which relative velocity is zero on the outer surfaces of the side wall portions 1$c$, 1$d$ and gradually increases as the distance from the outer surfaces increase, i.e., the so-called hydrodynamic boundary layer is created. This hydrodynamic boundary layer become thinner by the influence of the air flow induced by the air removing mechanism 41 than when the tire is merely rotated. Similarly, concerning a temperature field, thermal boundary layers present near the side wall portions become thinner. The thinner the boundary layers, the less the heat resistance, therefore the side wall portions 1$c$, 1$d$ can be quickly cooled. The vulcanized tire 1 needs to be rotated at such a high speed as to make the hydrodynamic boundary layers sufficiently thin. Specifically, the vulcanized tire 1 is rotated at 100 rpm or faster, preferably at 200 rpm or faster, more preferably at 300 rpm or faster. By being rotated even faster, the vulcanized tire 1 can be more quickly cooled.

The air present near the side wall portions 1$c$, 1$d$ having reached a high temperature by the heat exchange is forcibly removed by the air removing mechanism 41. Specifically, when the cooling is started by the rotation of the vulcanized tire 1, the low-temperature air from the annular pipes 45 of the cooling air supplying mechanisms 44 is jetted out toward the blade members 42. When the respective rim mechanisms 3, 2 are rotated, the blade members 42 provided in these rim mechanisms 3, 2 are rotated, i.e., turn about the centers of axes of the rim mechanisms 3, 2. As a result, the air before the heat exchange including the cooling air present in the first spatial areas A of the respective rim mechanisms 3, 2 is pushed from the partitioning members 43 toward the tire 1 by the blade members 42, thereby becoming an air flow (wind) containing components in the directions along the side wall portions 1$c$, 1$d$ of the vulcanized tire 1.

In this way, the high-temperature air after the heat exchange present near the side wall portions 1$c$, 1$d$ are removed from the vulcanized tire 1, and the air before the heat exchange is supplied from the first spatial areas A by the blade members 42 so as to make up for the thus removed air. Accordingly, the side wall portions 1$c$, 1$d$ of the vulcanized tire 1 are cooled to a specified temperature or lower within a short period of time since the heat exchange is constantly performed between the airs having a large temperature difference. In the case of providing the blade members 42, equivalent effects can be obtained at a lower rotating speed or within a shorter period of time as compared to a case where no blade member is provided.

Further, since the second spatial areas B near the side wall portions 1$c$, 1$d$ are partitioned from the first spatial areas A by the partitioning members 43, the high-temperature air in the second spatial areas B having reached a high temperature by the heat exchange with the vulcanized tire 1 is hindered from moving toward the first spatial areas A. As a result, only the air before the heat exchange is present in the first spatial areas A and flows toward the blade members 42. Therefore, the side wall portions 1c, 1d can be more efficiently cooled.

During the cooling by the high-speed rotation of the vulcanized tire 1, the air in the side wall portions 1c, 1d at the upper and lower sides is caused to flow radially outward of the vulcanized tire 1. This can prevent an occurrence of such a situation where the air having reached a high temperature by the heat exchange with the lower side wall portion 1d moves up by the natural convection to the upper side wall portion 1c. Thus, the upper and lower side wall portions 1c, 1d can be cooled on the same conditions. The air inside the vulcanized tire 1 is induced to a flow symmetric at the opposite axial sides by a centrifugal force produced by such a high-speed rotation, thereby promoting the symmetric (uniform) cooling at the opposite axial sides from the inside of the vulcanized tire 1. In the post cure inflator 101 including the rotating mechanism 10 for rotating the vulcanized tire 1 at a high speed of 100 rpm or faster, the cooling in conformity with the shape of the vulcanized tire 1, the uniform cooling from the inside and outside of the vulcanized tire 1 and the adjustment and shortening of the cooling time can be realized by suitably adjusting the rotating speed of the vulcanized tire 1, the presence or absence of the blade members 42, the presence or absence of the relative rotation of the vulcanized tire 1 and the blade members 42, and the rotating speeds of the upper and lower blade members 42. It is also possible to make such an adjustment as to complete the cooling within one vulcanization cycle. In other words, the post cure inflator 101 may have such construction and mechanism as to make an adjustment to complete the cooling within one vulcanization cycle, for example, such construction and mechanism as to suitably adjust the rotating speed of the vulcanized tire 1, the presence or absence of the blade members 42, the presence or absence of the relative rotation of the vulcanized tire 1 and the blade members 42, and the rotating speeds of the upper and lower blade members 42. The vulcanized tire 1 after the cooling has high qualities since the vulcanized tire 1 is cooled in a well-balanced manner with respect to vertical and circumferential directions.

When the cooling of the vulcanized tires 1 is completed as above, the air for inflation is discharged and the locking members 32 are rotated in forward direction by the rotary mechanisms 34 in the locking mechanisms 31, whereby the projecting portions 33a of the locking shafts 33 and the insertion grooves 32c of the locking members 32 are aligned with respect to vertical direction. Thereafter, the locking shafts 33 are lowered and the projecting portions 33a located in the recessed portions 32a exit through the insertion grooves 32c. When the cooled vulcanized tires 1 are lowered together with the lower rim mechanisms 2 to the unillustrated tire placing positions, the vulcanized tires 1 are carried out by the rotary loaders 104 as shown in FIGS. 1 and 2 and the cooling of the next vulcanized tires 1 is started without any waiting time.

Second Embodiment

Next, a post cure inflator according to a second embodiment of the invention is described.

Figure 5:
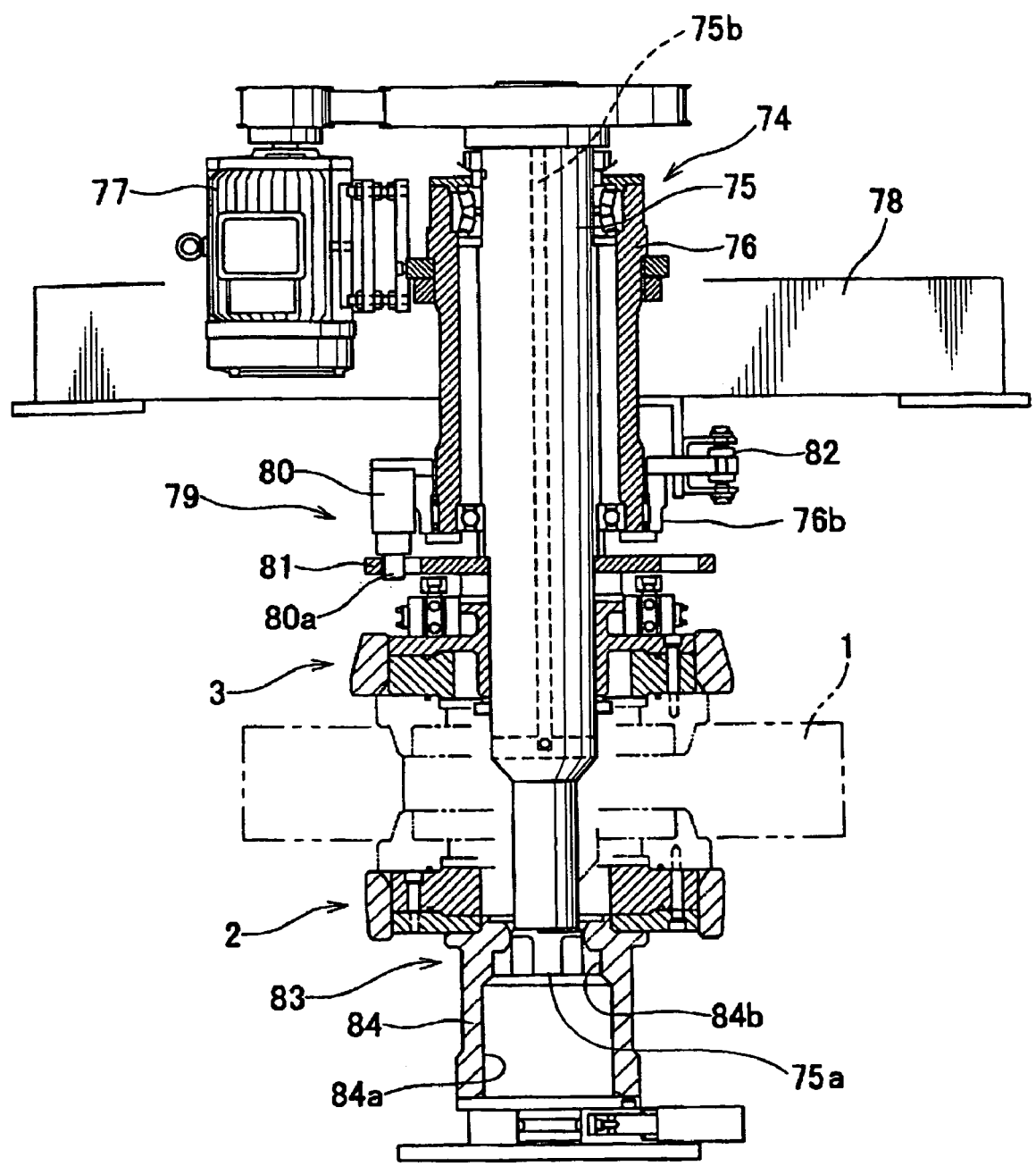
FIG. 5 is a schematic construction diagram in vertical section showing the post cure inflator.
Figure 6:
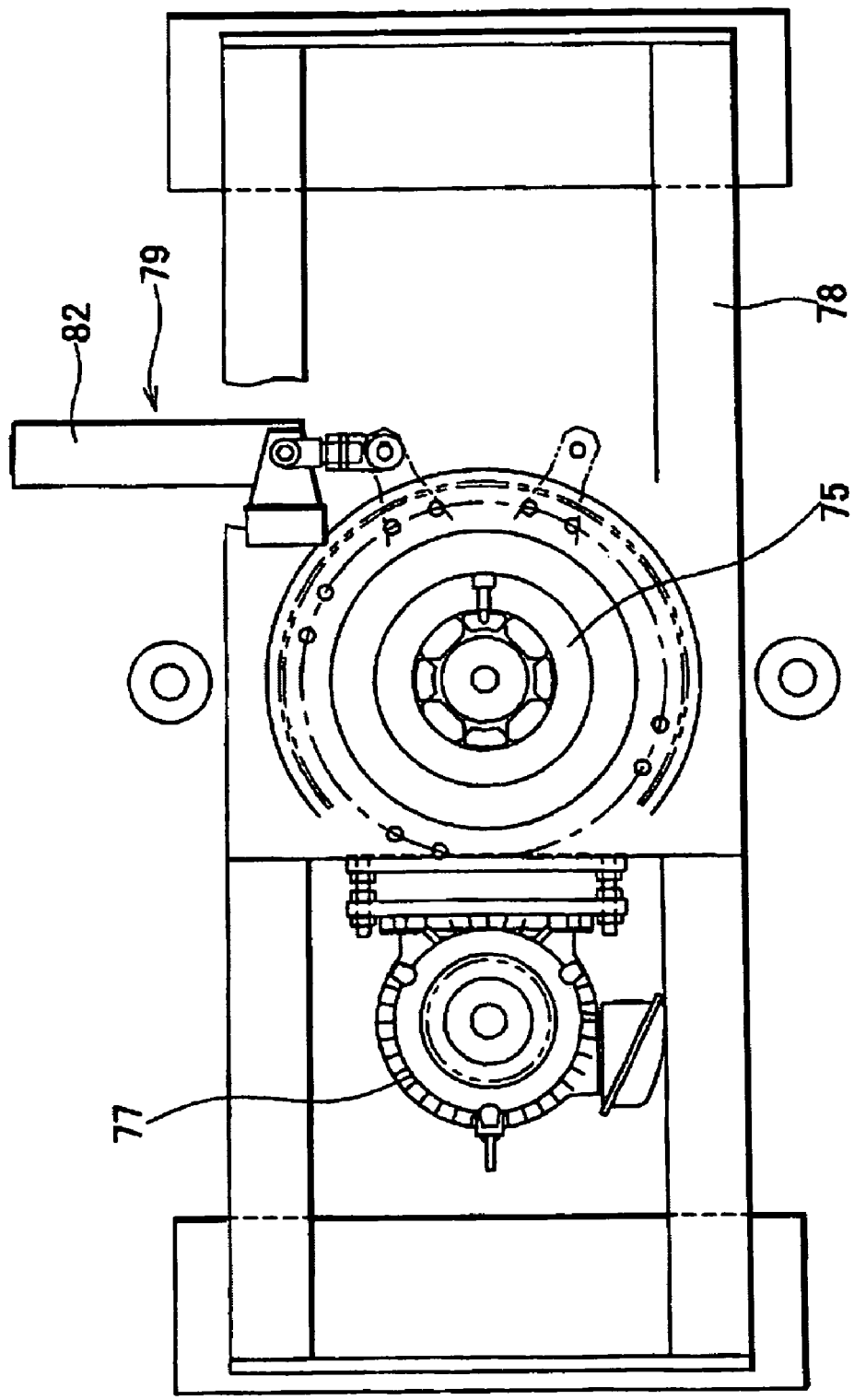
FIG. 6 is a schematic plan view of the post cure inflator.

In FIGS. 5 and 6 schematically showing a post cure inflator according to a second embodiment of the present invention, the same members as those of the post cure inflator 101 of the first embodiment are identified by the same reference numerals and are not described here. Although the air removing mechanisms 41 and the like are not shown, the members and mechanisms described in the first embodiment may be suitably provided if necessary.

As shown in FIGS. 5 and 6, the post cure inflator includes a lower rim mechanism 2 for holding the lower surface of a horizontally placed vulcanized tire 1 and an upper rim mechanism 3 for holding the upper surface of the vulcanized tire 1. The upper rim mechanism 3 is made rotatable at an arbitrary speed by a rotating mechanism 74, which includes a rotary shaft member 75 coupled to the upper rim mechanism 3, an outer tube member 76 for rotatably supporting the rotary shaft member 75 and vertically holding the rotary shaft member 75, and a drive motor 77 coupled to the upper end of the rotary shaft member 75 via a pulley and a belt. The rotary shaft member 75 is formed with an air hole 75b, which is connected with an air supplying device via an unillustrated air pipe after vertically penetrating the rotary shaft member 75.

As also shown in FIG. 5, the outer tube member 76 supporting the rotary shaft member 75 is secured to a horizontal frame 78. A rotary mechanism 79 is arranged on the outer circumferential surface of the outer tube member 76. The rotary member 79 is provided on the outer circumferential surface of a tube portion 76b and includes an engaging cylinder 80 whose rod 80a is vertically movable, an engaging board 81 which is so arranged as to be engageable with the rod 80a of the engaging cylinder 80 and secured to the rotary shaft member 75, and a rotating cylinder 82 supported on the outer tube member 76 for horizontally rotating the tube member 76b.

A locking mechanism 83 is provided below the rotary mechanism 79 and includes projecting portions 75a formed at the bottom end (leading end) of the rotary shaft member 75 and a locking member 84 coupled to the upper rim mechanism 3. The locking member 84 has a recessed portion 84a having an open upper end. Latching portions 84b projecting radially inward from four positions on the side wall surface of the recessed portion 84a are formed at the upper end of the recessed portion 84a, and insertion grooves (notches) are formed between adjacent latching portions 84b. The insertion grooves are so formed as to permit the passage of the projecting portions 75a of the rotary shaft member 75. The locking mechanism 83 thus constructed brings the projecting portions 75a and the insertion grooves into alignment with respect to vertical direction by rotating the rotary shaft member 75, for example, in forward direction by means of the rotary mechanism 79, whereby the projecting portions 75a are made free to enter and exit the recessed portion 84a. On the other hand, the locking mechanism 83 brings the projecting portions 75a and the latching portions 84b into alignment with respect to vertical direction by rotating the rotary shaft member 75, for example, in reverse direction, whereby the projecting portions 75a can be fixed in the recessed portion 84a. The other construction is the same as in the post cure inflator of the first embodiment.

Next, the operation of the post cure inflator having the above construction is described.

First, at an unillustrated tire placing position reached by lowering the lower rim mechanism 2 to a lower limit position, the vulcanized tire 1 is placed on the lower rim mechanism 2 and held thereby. Thereafter, the lower rim mechanism 2 is moved upward together with the locking mechanism 83 to move the lower rim mechanism 2 and the vulcanized tire 1 upward. At this time, the rotary shaft member 75 located above the locking mechanism 83 is rotated in forward direction by the rotary mechanism 79, whereby the projecting portions 75a are aligned with the insertion grooves of the locking member 84 with respect to vertical direction. Accordingly, the locking member 84 moving upward inserts the projecting portions 75*a* into the recessed portion 84*a*. When the lower rim mechanism 2 reaches a tire mounting position as an upper limit position, the upward movement is stopped and the vulcanized tire 1 is hermetically held by the upper rim mechanism 3.

Thereafter, the rotary shaft member 75 is rotated in reverse direction in the rotary mechanism 79, whereby the latching portions 84*b* of the locking member 84 are aligned with the projecting portions 75*a* of the rotary shaft member 75 with respect to vertical direction. Then, the air supplying mechanism is operated in the unillustrated air supplying device to supply the air for inflation into the vulcanized tire 1 at a specified pressure. As a result, the projecting portions 75*a* of the rotary shaft member 75 are fixed by the latching portions 84*b* with respect to vertical direction in the recessed portion 84*b*, whereby the upper rim mechanism 3 and lower rim mechanism 2 are fixed at a specified distance from each other via the rotary shaft member 75, and the vulcanized tires 1 are inflated and held in a specified shape.

Subsequently, the rod 80*a* of the engaging cylinder 80 is retracted to be disengaged from the engaging board 81, whereby the rotary shaft member 75 is made rotatable with respect to the outer tube member 76. Thereafter, the drive motor 77 is operated to rotate the rotary shaft member 75 via the pulley and the belt. In this way, the vulcanized tire 1 is expansion-cooled by being rotated at a high speed.

When the cooling of the vulcanized tire 1 is completed, the locked state is canceled by a reverse operation from the aforementioned one of coupling the lower and upper rim mechanisms 2, 3 by the locking mechanism 83 and the rotary mechanism 70 after the air for inflation is discharged. After the lower rim mechanism 2 is lowered to the unillustrated tire placing position together with the vulcanized tire 1 and stopped there, the vulcanized tire 1 is carried out and the cooling of the next vulcanized tire 1 is started. The other operations are the same as in the post cure inflator 101 of the first embodiment.

Next, the following simulation tests were conducted in order to confirm the cooling effect by the post cure inflators according to the first and second embodiments.

Figure 7:
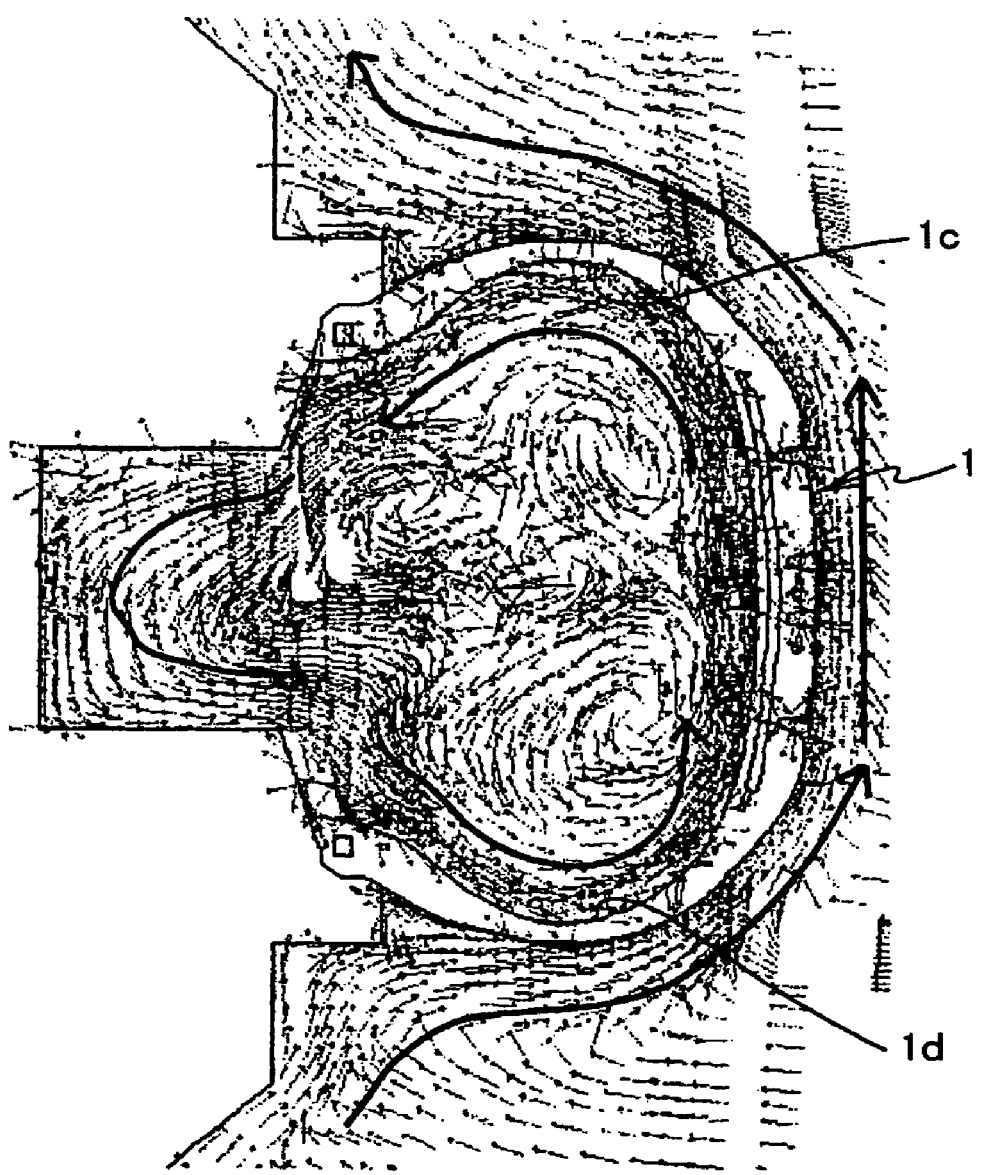
FIG. 7 is a diagram showing a simulation result of air flows by a conventional post cure inflator.
Figure 8:
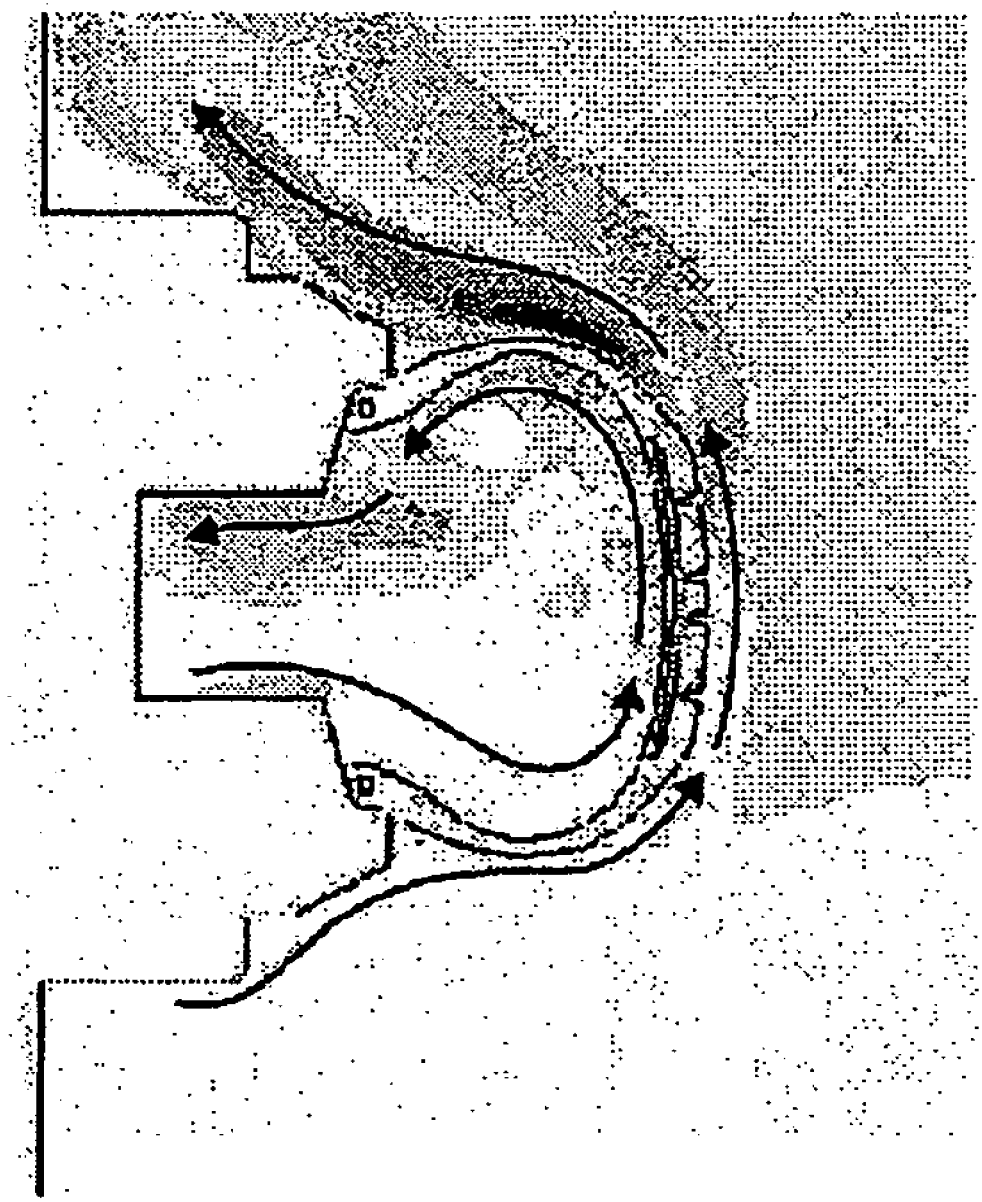
FIG. 8 is a diagram showing a simulation result of the air flows by the conventional post cure inflator.

As is conventionally done, the flowing states of air flows created in and around the vulcanized tire 1 when the vulcanized tire 1 was stationarily placed (rotating speed of 0 rpm) were checked. FIGS. 7 and 8 show the simulation result. FIG. 7 is a diagram showing velocity vectors of radial and vertical directions, and FIG. 8 is a diagram showing isograms of velocity components in radial directions. It should be noted that the darker the tone, the larger the velocity. As a result, it was confirmed that the air having reached a high temperature rises at the lower side wall portion 1*d* of the vulcanized tire 1 outside the vulcanized tire 1, thereby creating an air flow (direction of arrows) of the natural convection flowing around the upper side wall portion 1*c* as shown in FIGS. 7 and 8. Further, it was confirmed that a natural convection rising along a belt inner liner portion was created and a temperature stratification was created to create a temperature difference between upper and lower parts inside the vulcanized tire 1.

Figure 9:
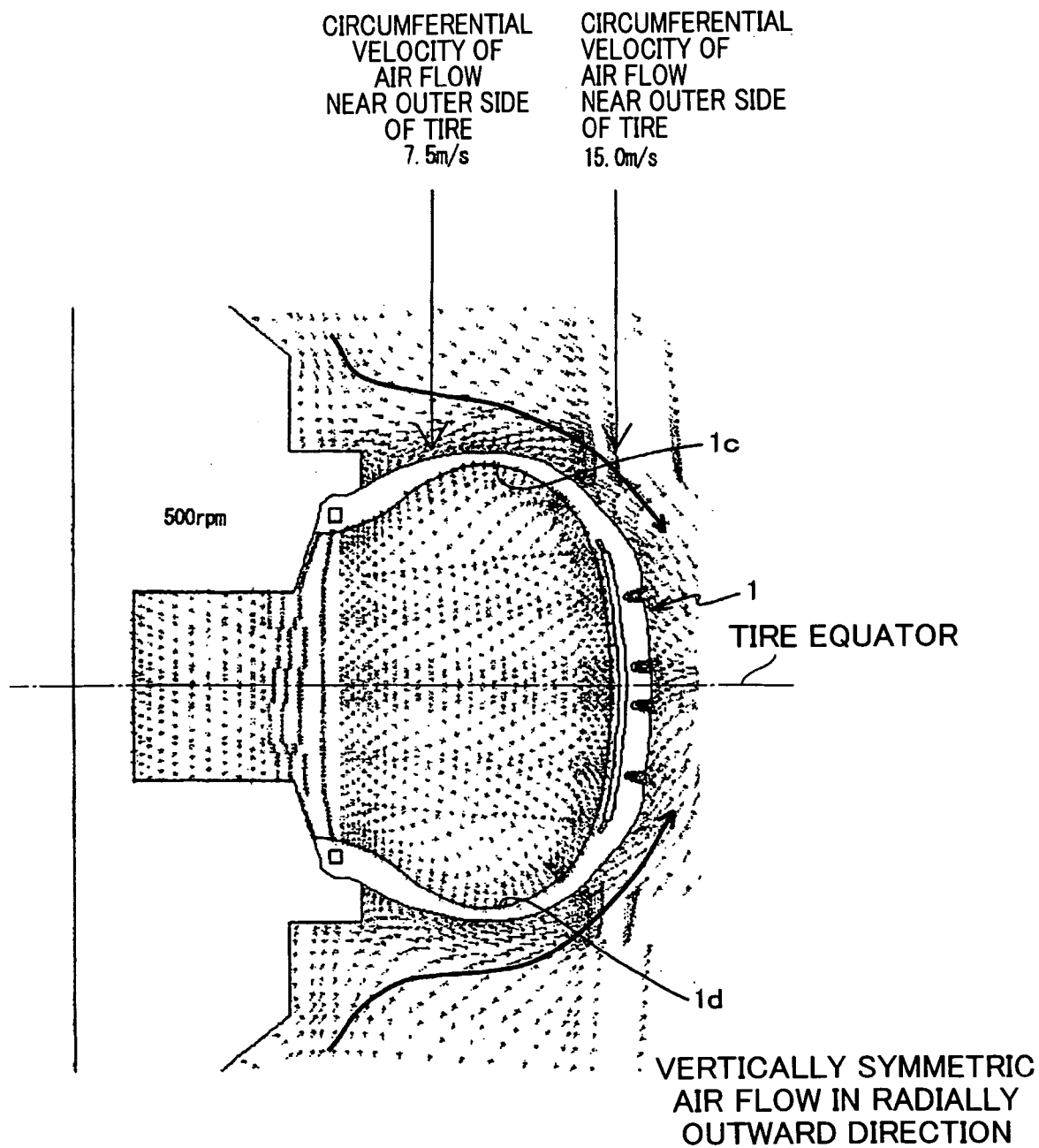
FIG. 9 is a diagram showing a simulation result of air flows by the inventive post cure inflator.

The vulcanized tire 1 was mounted in the post cure inflator provided with the blade members 42, and the flowing states of air flows created in and around the vulcanized tire 1 when the vulcanized tire 1 was rotated at a rotating speed of 500 rpm were checked. FIG. 9 shows the simulation result and is a diagram showing velocity vectors of radial and vertical directions. As a result, it was confirmed that the air flows of the forced convection (directions of arrows) including components in directions along the side wall portions 1*c*, 1*d* of the vulcanized tire 1, i.e., the air flows symmetric at the opposite axial sides with respect to the equator of the vulcanized tire 1 were created, and the air present near the side wall portions 1*c*, 1*d* was symmetrically and forcibly removed at the opposite axial sides with respect to the tire equator as shown in FIG. 9.

Figure 10:
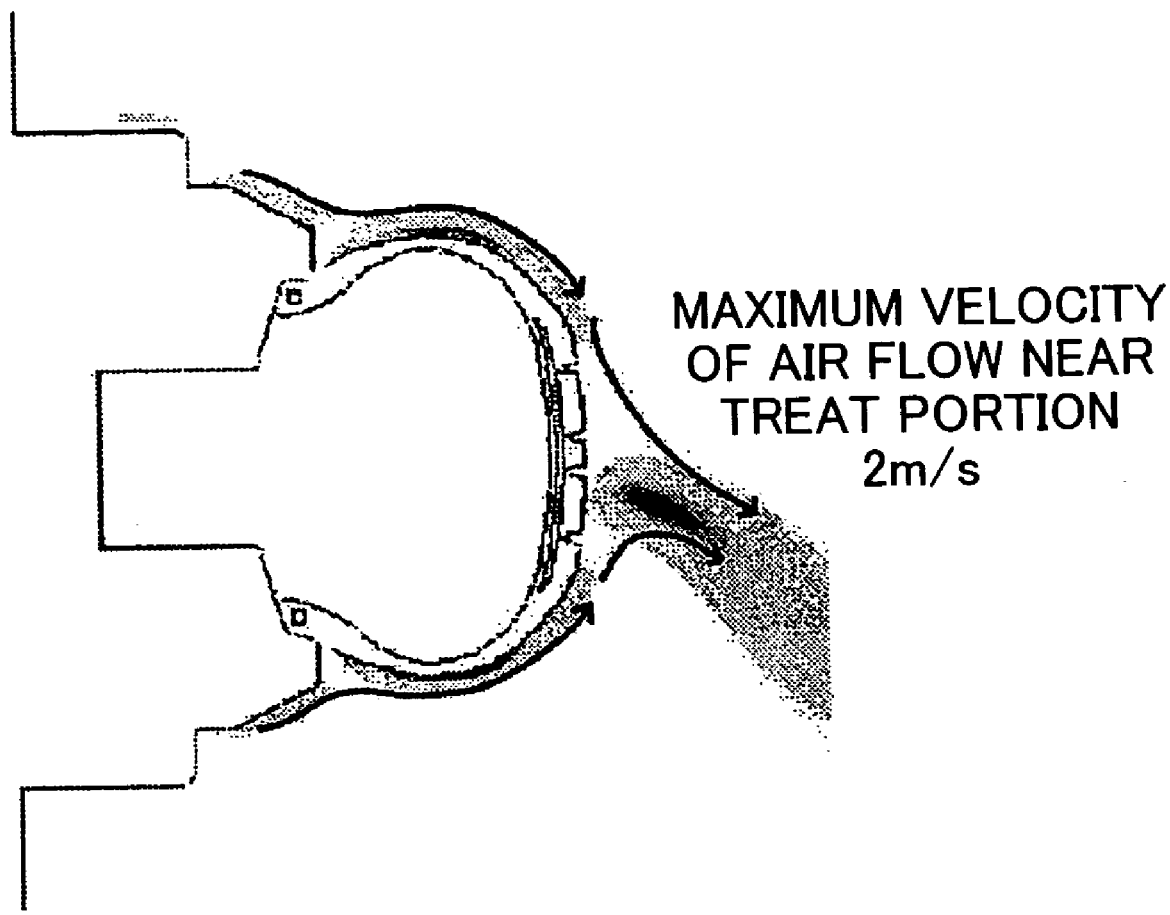
FIG. 10 is a diagram showing a simulation result of the air flows by the inventive post cure inflator.

Further, for both the case where the blade members 42 are provided and the case where no blade member is provided, the flowing states of the air flows created in and around the vulcanized tire 1 when the vulcanized tire 1 was rotated at a rotating speed of 600 rpm were checked. FIGS. 10 and 11 show the simulation results. FIG. 10 is a diagram showing isograms of radial-direction components (with the blade members), whereas FIG. 11 is a diagram showing isograms of radial-direction components (without the blade members). In both figures, the darker the tone, the larger the velocity components. As a result, it was confirmed that relative velocity to the ambient air along circumferential direction was large and dominant, but the air flow (directions of arrows) including components in the directions along the side wall portions 1*c*, 1*d* of the vulcanized tire 1 increased for the secondary flow of radially outward directions and the air present near the side wall portions 1*c*, 1*d* was more effectively removed by providing the blade members as shown in FIGS. 10 and 11.

As described above, each of the post cure inflators according to the first and second embodiments is provided with the upper and lower rim mechanisms 3, 2 (vulcanized-tire holding mechanism) for holding the upper and lower bead portions 1*a*, 1*b* of the vulcanized tire 1, and the rotating mechanism 10 for rotating the vulcanized tire 1 at a high speed via the rim mechanisms 3, 2, and constructed to actively remove the heat of the vulcanized tire 1 by the forced convection (i.e., to actively cool the vulcanized tire 1 from the outside) by rotating the vulcanized tire 1 by means of the rotating mechanism 10 such that the forced convection becomes more dominant than the natural convection in the air flow around the vulcanized tire 1. Thus, the vulcanized tire 1 can be cooled to a specified temperature or lower within a shorter period of time.

At this time, since the vulcanized tire 1 is symmetrically shaped with respect to the axial center point, the forced convection created by the high-speed rotation of the vulcanized tire 1 becomes the air flow symmetric at the opposite axial sides with respect to the equator of the vulcanized tire 1, and the air present inside the vulcanized tire 1 is induced to the air flow symmetric at the opposite axial sides, thereby attaining an inner-surface temperature distribution symmetric at the opposite axial sides. In other words, the vulcanized tire is expansion-cooled in such a manner that physical property values become symmetric at the opposite axial sides with respect to the equator of the vulcanized tire 1. Accordingly, the vulcanized tire 1 can be symmetrically cooled at the opposite axial sides with respect to the equator of the vulcanized tire 1, with the result that the qualities such as uniformity and conicity of the vulcanized tire 1 after the cooling can be improved.

Specifically, according to the method for cooling the vulcanized tire 1 in the first and second embodiments, the vulcanized tire 1 is expansion-cooled while causing the air outside the vulcanized tire 1 to flow such that the forced convection becomes more dominant than the natural convection to make the physical properties take values symmetric at the opposite axial sides with respect to the equator of the vulcanized tire 1. Thus, the vulcanized tire 1 can be cooled in a well-balanced manner along the vertical and circumferential directions of the vulcanized tire 1, with the result that the qualities such as uniformity and conicity of the vulcanized tire 1 after the cooling can be improved. Further, since the vulcanized tire 1 is actively cooled from the outside by creating the air flow by the forced convection outside the vulcanized tire 1, the vulcanized tire 1 can be expansion-cooled within a shorter period of time.

Particularly, in the first and second embodiments, the qualities can be improved while shortening the cooling time since the vulcanized tire 1 is rotated at a high speed of 100 rpm or faster. The lower limit value of the high-speed rotation is set at 100 rpm for the following reasons. As shown in graphs of FIGS. 15 and 16 to be described later, when the vulcanized tire 1 was expansion-cooled by being rotated at a rotating speed of 100 rpm, conicity was improved by more than 30% and the cooling time was shortened by more than 20% as compared to a case where the vulcanized tire was expansion-cooled without being rotated. Thus, remarkable effects can be expected. Further, the vulcanized tire 1 can be sufficiently cooled to a temperature at which no thermal contraction occurs by being rotated at a high speed of 100 rpm or faster, whereby, for example, the carcass members such as reinforcing fibers can be prevented from undergoing thermal contraction after the cooling and differences in the physical property values between the opposite axial sides with respect to the tire equator can be reduced. AS a result, uniformity can be improved.

Further, since the vulcanized tire 1 is cooled by the high-speed rotation by means of the rotating mechanism 10, the running cost required for the cooling is not increased and there is no likelihood of increasing the size of the apparatus, complicating the mechanisms and increasing the parts cost as compared to a case where the driving source and the pipe for the cooling are added as have been conventionally done.

Furthermore, since the air removing mechanism 41 is provided to forcibly remove the air present near the side wall portions 1c, 1d (near the side surface portions) of the vulcanized tire 1 utilizing the rotation by the rotating mechanism 10 and to introduce the cooling air from the outside, the vulcanized tire 1 can be cooled to a specified temperature or lower within a shorter period of time as compared to a case where the vulcanized tire 1 is cooled by being merely rotated.

Particularly, in the first embodiment, the air removing mechanisms 41 are provided with the blade members 42 provided on the respective rim mechanisms 3, 2 for creating the air flows containing components in the directions along the side wall portions 1c, 1d of the vulcanized tire 1 by being rotated together with the respective rim mechanisms 3, 2. Thus, the air present near the side wall portions 1c, 1d of the vulcanized tire 1 can be satisfactorily removed by a simple construction of providing the blade members 42 on the respective rim mechanisms 3, 2, with the result that the physical property values can be more symmetric at the opposite axial sides with respect to the tire equator. It should be noted that the post cure inflator of the second embodiment may similarly include the blade members 42.

Here, any shape and any arrangement of the blade members 42 may be chosen provided that the blade members 42 create the air flow containing components in the directions along the side wall portions 1c, 1d of the vulcanized tire 1. For example, only one blade member 42 may be provided; the angle of inclination, the shape and the size of the blade members 42 may individually differ; and the blade members 42 may be flat plates. Further, the upper parts of the blade members 42 may be bent in air flowing direction, i.e., toward the side wall portions 1c, 1d so that the created air flow contains more components in directions normal to the side wall portions 1c, 1d or the entire blade members 42 may be inclined toward the side wall portions 1c, 1d.

The blade members 42 may be provided at desired positions of the vulcanized tire 1 such as the thickest parts of the side wall portions 1c, 1d in such a manner as to satisfy the condition of creating air flows faster at the desired parts than at other parts. In such a case, since more heat can be removed at the desired parts than at the other parts by creating larger air flows at the desired parts of the vulcanized tire 1, the desired parts can be selectively cooled. As a result, the vulcanized tire 1 can be cooled in an ideal state. "To satisfy the condition" means that larger air flows are created at the desired parts than at the other parts by adjusting at least one of air-flow changing factors such as the number, the angle of inclination and the shape of the blade members 42.

In the first embodiment, each air removing mechanism 41 includes the partitioning member 43 for partitioning the area around of the tire 1 into the first spatial areas A at the air inflow side toward the blade members 42 and the second spatial areas B near the side wall portion 1c, 1d so that the second spatial area B is partitioned off from the first spatial area A when the temperature of the air present in the second spatial area B rises due to the heat exchange with the vulcanized tire 1. Thus, movements of the air having reached a high temperature into the first spatial areas A can be effectively prevented. As a result, only the air before the heat exchange is present in the first spatial areas A and this air flows toward the blade members 42, wherefore the vulcanized tire 1 can be more efficiently cooled. It should be noted that the post cure inflator of the second embodiment may similarly include the partitioning members 43.

In the first embodiment, the air removing mechanism 41 includes the cooling air supplying mechanism 44 for supplying the cooling air to the blade members 42, thereby sending the cooling air to the vulcanized tire 1. Thus, the vulcanized tire 1 can be more efficiently cooled. It should be noted that the post cure inflator of the second embodiment may similarly include the cooling air supplying mechanism 44.

The post cure inflator of the first embodiment further includes the air replacing mechanism for replacing the air for inflation to inflate the vulcanized tire 1 during the rotation of the vulcanized tire 1 and can actively cool the vulcanized tire 1 from the inner side. Thus, the vulcanized tire 1 can be more efficiently cooled. It should be noted that the post cure inflator of the second embodiment may similarly include the air replacing mechanism.

In the first and second embodiments, the vulcanized tire 1 carried out from the vulcanizer 102 for vulcanizing the green tire 107 as a raw tire is expansion-cooled while being held as shown in FIG. 1. The rotating mechanism 10 is provided to rotate the vulcanized tire 1 at such a high speed as to cool the vulcanized tire 1 to a specified temperature of 80° C. or lower within the vulcanization time in the vulcanizer 102.

Accordingly, the vulcanized tire 1 can be invariably cooled within one cycle time period of the vulcanization for vulcanizing the green tire 107 into the vulcanized tire 1 in the vulcanizer 102. Thus, the vulcanized tire 1 can be set in the vulcanized-tire holding mechanism 2 to start the expansion cooling without any waiting time after the vulcanization. Further, since it is sufficient to provide a minimum number of the vulcanized-tire holding mechanisms 2, the construction of the post cure inflator can be simplified and the parts cost and the assembling cost can be reduced. Furthermore, since the vulcanized-tire holding mechanism 2 is arranged at a specified position, the vulcanized tire 1 can be set in the vulcanized-tire holding mechanism 2 with improved precision. Therefore, high qualities can be maintained for the vulcanized tire 1 after the expansion cooling and quality variation can be reduced.

In the first and second embodiments, the post cure inflator is of the cooling position fixed type in which the process from the holding of the vulcanized tire 1 by the upper and lower rim mechanisms 3, 2 (vulcanized-tire holding mechanism) to the expansion cooling is performed at the same position and in the same posture as shown in FIG. 3, i.e., only one position is provided for the process. Since this can simplify the construction of the equipment, mechanical precision and precision in positioning and holding the vulcanized tire can be improved, with the result that the qualities of the tire can be further improved through, for example, an improvement of the tire uniformity. Further, the reliability of the equipment is increased and the frequency and cost of short interruptions and maintenance can be reduced. In a post cure inflator of the type in which the vulcanized-tire holding mechanism 2 is vertically inverted to change the cooling position, the vulcanizer 102 and the post cure inflator 101 need to be sufficiently distanced from each other. However, in the case of the post cure inflator of the fixed cooling position type, an apparatus installation space is reduced (particularly depth direction along forward and backward directions) since the vulcanizer 102 and the post cure inflator 101 are proximate to each other. Thus, if an unloader is used as a conveying mechanism for conveying the vulcanized tire 1 from the vulcanizer 102 to the post cure inflator 101, a radius of turn of this unloader becomes smaller, wherefore a turning moment becomes smaller and the vulcanized tire 1 can be highly precisely conveyed to the vulcanized-tire holding mechanism 2.

The air removing mechanism 42 of the first embodiment is so constructed as to create the air flows at the opposite side surface portions of the vulcanized tire 1 by rotating the air present near the opposite side surfaces of the vulcanized tire 1 directly using the rotating force of the rotating mechanism 10. However, it is sufficient for the air removing mechanism 41 to exhibit a function of forcibly removing the air present near the side wall portions 1*c*, 1*d* (near the side surface portions) of the vulcanized tire 1 using the rotation by the rotating mechanism 10, and the air removing mechanism 41 may be fixed so as not to rotate itself.

Alternatively, the air removing mechanism 42 may be so constructed as to face or to be proximate to the opposite side surface portions of the vulcanized tire 1 so as to forcibly flow or rake and remove the air present near the side wall portions 1*c*, 1*d* of the vulcanized tire 1 in cooperation with the rotation of the vulcanized tire 1. With this construction, the air removing mechanism 41 may not be driven via the vulcanized-tire holding mechanism, i.e., may not be driven by the same driving source as the one for the vulcanized-tire holding mechanism. In such a case, the vulcanized tire 1 can be cooled on desired conditions suitable therefor by rotating the air removing mechanism 41 in a direction opposite from the rotating direction of the vulcanized tire 1 or rotating the air removing mechanism 41 at a speed different from the rotating speed of the vulcanized tire 1.

Further, an air remover or air removing mechanism 41 includes the first air removing mechanism and the second air removing mechanism, wherein the first air removing mechanism forcibly removes the air present near one side surface portion of the vulcanized tire 1 by rotating it utilizing the rotating force of the rotating mechanism to create the air flow at the one side surface portion, thereby forcibly removing the air present near one side surface portion of the vulcanized tire 1, and the second air removing mechanism is provided to face the other side surface portion of the vulcanized tire so as to forcibly flow or agitate and remove the air present near the other side surface portion of the vulcanized tire in cooperation with the rotation of the vulcanized tire. Here, the air removing mechanism at the other side may include fixed blades corresponding to the side wall portion 1*c*, 1*d* or blades rotatable by canceling their fixed state.

In the first and second embodiments, the vulcanized tire 1 is rotated at a high speed while being horizontally held by the upper and lower rim mechanism 3, 2 (vulcanized-tire holding mechanism). The present invention is not limited thereto. The vulcanized tire 1 may be rotated at a high speed while being held in an oblique posture or in a vertical posture, i.e., in such a posture that the center axis of the vulcanized tire 1 is aligned with horizontal direction. In the case of rotating the vulcanized tire 1 at a high speed in a vertical posture, the symmetry of the air flows at the opposite axial sides with respect to the equator is further improved, thereby further improving the symmetry of the cooling or the qualities such as uniformity.

Although the one vulcanized tire 1 is cooled at the position below the horizontal frame 6 in the first and second embodiments, the present invention is not limited thereto. Identically constructed mechanisms may be symmetrically provided with respect to the horizontal frame 6 and may be vertically inverted.

Further, in the first and second embodiments, the post cure inflator is of the cooling position fixed type in which the process from the holding of the vulcanized tire 1 by the upper and lower rim mechanisms 3, 2 (vulcanized-tire holding mechanism) to the expansion cooling is performed at the same position and in the same posture as shown in FIG. 1, i.e., only one position is provided for the process. Thus, the equipment can have a simple construction, thereby enabling an improvement in mechanical precision and improvements in precisions of conveying and holding vulcanized tire, with the result that the qualities of the tire can be further improved through the improved uniformity of the tire and other factors. Further, the reliability of the equipment is increased and the frequency and cost of short interruptions and maintenance can be reduced.

Figure 12:
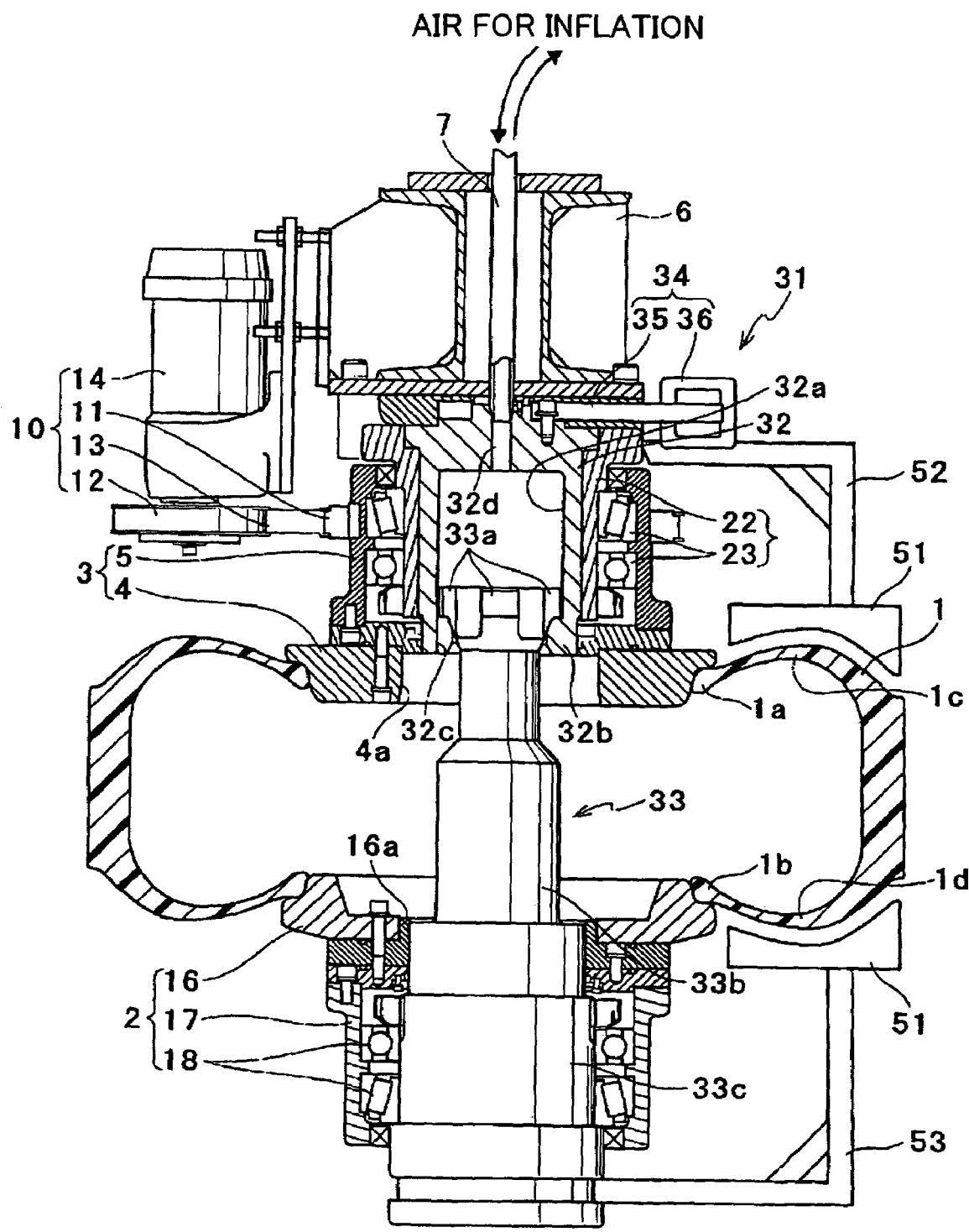
FIG. 12 is a schematic construction diagram in vertical section showing the post cure inflator.

The present invention has been described based on the preferable embodiments, but it can be changed without departing from the scope thereof. Specifically, as shown in FIG. 12, the post cure inflator may include raking members 51 which are fixed while being opposed to the side wall portions 1*c*, 1*d* of the vulcanized tire 1 for raking the air present near the side wall portions 1*c*, 1*d* as the air removing mechanisms 41.

More specifically, the raking members 51 are formed such that the surfaces thereof facing the side wall portions 1*c*, 1*d* are equidistant from the side wall portions 1*c*, 1*d*. Further, the raking members 51 are arranged above and below the side wall portions 1*c*, 1*d*. The upper raking members 51 are fixed to the tubular supporting member 22 via an upper supporting member 52, whereas the lower raking members 51 are fixed to the shaft supporting portion 33*c* of the locking shaft 33 via a lower supporting member 53.

Figure 13:
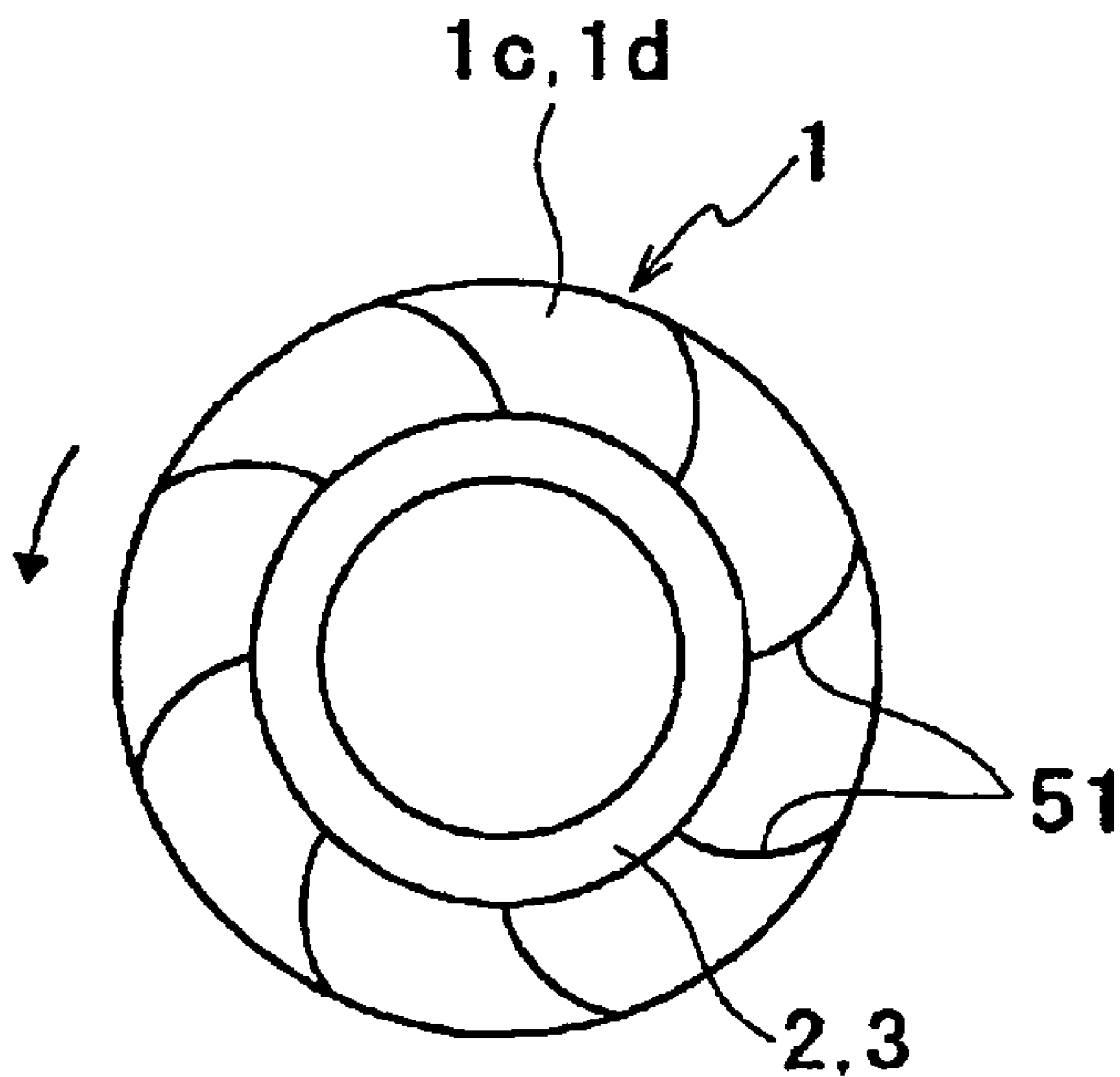
FIG. 13 is a diagram showing an arranged state of blade members.

Further, as shown in FIG. 13, a plurality of raking members 51 are arranged at even intervals in an annular area facing the side wall portion 1*c*, 1*d*. Each raking member 52 is a plate curved substantially at the same radius of curvature as the outer circumferential surface of the vulcanized tire 1, and is oblique the radial directions of the vulcanized tire 1. In other words, each raking member 51 is inclined such that a radially inner end is located more upstream than a radially outer end with respect to rotating direction (direction of arrow in FIG. 13).

Each raking member 51 may be inclined such that a radially inner end is located more downstream than a radially outer end with respect to rotating direction (direction of arrow in FIG. 13). The raking members 51 may be provided in combination with the blade members 42 and the partitioning members 43 and/or the cooling air supplying mechanisms 44 of the air removing mechanisms 41 shown in FIG. 3. It is sufficient for the raking members 51 to rotate relative to the side wall portions of the vulcanized tire to rake the air present near the side wall portions, and the raking members 51 may not be limited to those fixed to the locking shaft and the tubular member.

With the above construction, when the vulcanized tire 1 is rotated, the side wall portions 1c, 1d move relative to the raking members 51, whereby the air present near the side wall portion 1c, 1d and moving together with the side wall portions 1c, 1d are raked by the raking members 51. As a result, the air present near the side wall portions 1c, 1d having reached a high temperature by the heat exchange with the vulcanized tire 1 is forcibly removed. Thus, the vulcanized tire 1 can be cooled to a specified temperature or lower within a short period of time.

Figure 14A:
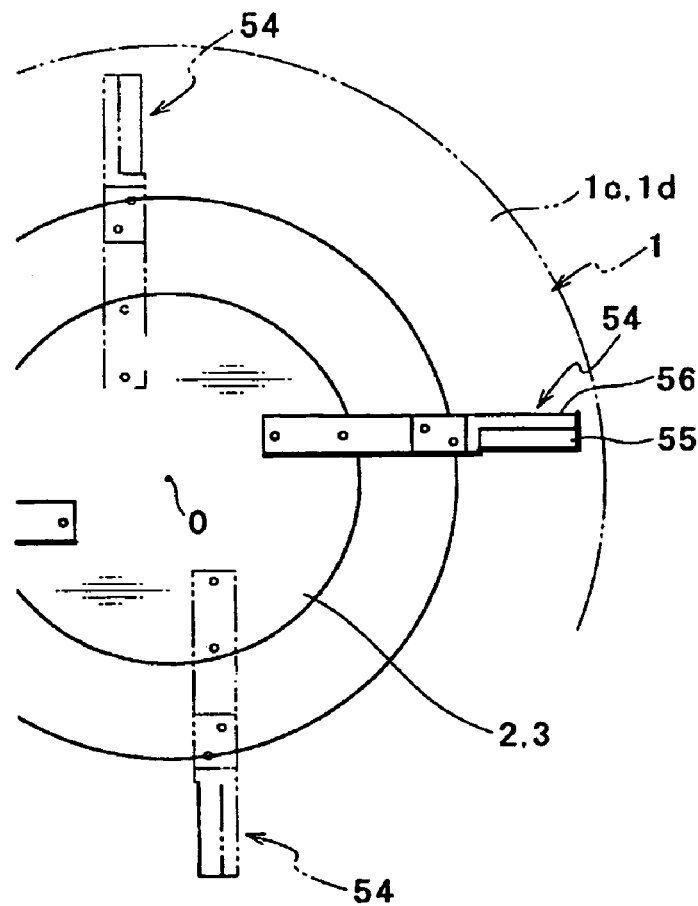
FIG. 14A is a plan view showing the arranged state of blade members.
Figure 14B:
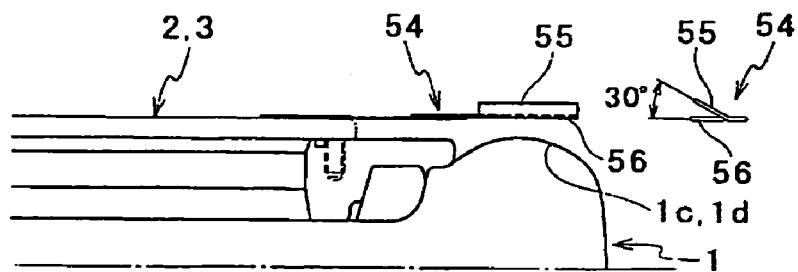
FIG. 14B is a front view showing the arranged state of blade members.

As shown in FIGS. 14A, 14B, the post cure inflator may be provided as the air removing mechanism 41 with axial-flow blade members 54 fixed to the respective rim mechanisms 3, 2 while being opposed to the side wall portions 1c, 1d of the vulcanized tire 1 and adapted to move (or remove) the air present near the side wall portions 1c, 1d by upward and downward air flows.

Specifically, the axial-flow blade members 54 have the rear ends thereof fixed to the corresponding rim mechanisms 3, 2 and are arranged at four circumferentially shifted positions with respect to a center of rotation O. The leading ends of the axial-flow blade members 54 are opposed to the side wall portions 1c, 1d and include first and second plate members 55, 56. The second plate members 56 are arranged in parallel with the side wall portion 1c, 1d, whereas the first plate members 55 have the upstream ends thereof connected with the corresponding second plate members 56 while having the downstream ends thereof inclined upward at a specified angle such as 30°.

The axial-flow blade members 54 may be formed such that the upstream ends of the first plate members 55 with respect to rotating direction are connected with the second plate members 56 and the downstream ends thereof are inclined downward at a specified angle such as 30°. Further, the axial-flow blade members 54 may be provided in combination of the blade members 42 and the partitioning members 43 and/or the cooling air supplying mechanisms 44 of the air removing mechanisms 41 shown in FIG. 3. The axial-flow blade members 54 may be so provided as to be rotatable relative to the vulcanized tire.

With this construction, when the vulcanized tire 1 is rotated, the side wall portions 1c, 1d and the axial-flow blade members 54 are rotated (moved) at the same speed or relatively rotated. In the axial-flow blade members 54, the second plate members 56 create upward and downward air flows moving away from the side wall portions 1c, 1d due to pressure differences of the air flows through the movements thereof. As a result, the air present near the side wall portions 1c, 1d and having reached a high temperature by the heat exchange with the vulcanized tire 1 is forcibly removed by the upward and downward air flows. Thus, the vulcanized tire 1 can be cooled to a specified temperature or lower within a short period of time.

Next will be described various experiments using the above-described post cure inflators.

First, for a vulcanized tire having a carcass structure made up of one carcass ply in which tire a folded portion folded up from an axially inner side toward an axially outer side around a bead core is integrally formed at a main body extending from a tread portion to a bead portion via side wall portions, a test was conducted for test items of a cooling time (min.) at the time of expansion cooling, a ratio (%) of this cooling time to the one of Prior Art 1, carcass cords (a difference between upper limit and lower limit values of the in-process extensibility (%)), and conicity while changing cooling conditions such as the rotating speed (rpm) of the vulcanized tire, the presence or absence of blades, the number of the blades and the shape of the blades. The above test items were also checked by expansion-cooling the vulcanized tire by a conventional method.

Here, the cooling time was defined as a time required to cool carcass portions of the side walls adjacent to the tread portion to 80° C. However, the cooling time by the conventional method was defined as a post cure inflation time by a currently used two-cycle method. Further, the carcass cord in-process extensibility was measured using the side wall portions gathered from the tires as samples. Conicity is an average value of twelve tires (N=12).

The in-process extensibility, i.e., rate of extension against a constant load is a rate of extension (%) measured when a constant load W is exerted in a measurement conducted as defined in paragraph 7.7 of JIS L1017 (Chemical Fiber Tire Cord Testing Method), and measured based on a standard test defined in paragraph 7.7.1. The constant load W is determined to be calculated by W (kgf)=4.5×(d2/d1). Here, d1 denotes a reference decitex determined by the kind of the fiber, and d2 denotes a display decitex of the sample. Per tire, four sets of the samples of the carcass cords were gathered from four substantially evenly circumferentially displaced positions of the side wall portion at each of the opposite sides (upper and lower sides) of the tire, each set being made up of a pair of upper and lower samples, and an average value of differences between the maximum and minimum values of the in-process extensibility for ten tires (forty sets of the samples) was calculated up to the first decimal place.

Specifically, a vulcanization cycle time (here, a sum of a vulcanization time and times required to open and close the mold and to carry the tire in and out) was set at 10 min. and radial tires for passenger vehicles whose size was 195/65 R1591S were prepared. Then, expansion cooling was performed by changing the above cooling conditions in various manners as shown in TABLE-1 and TABLE-2. The cooling conditions and the test results were shown in detail for Examples 1 to 13 and Prior Art 1 in TABLE-1 and TABLE-2. The rates of the cooling times of Examples 1 to 8 to the cooling time by the convention method were calculated and graphically represented as shown in FIG. 15. As reference data, these rates when the rotating speed was 30, 50 and 80 rpm were also written.

TABLE 1

|  |  | Prior Art 1 | EX. 1 | EX. 2 | EX. 3 | EX. 4 | EX. 5 | EX. 6 | EX. 7 | EX. 8 | EX. 9 | EX. 10 |
|---|---|---|---|---|---|---|---|---|---|---|---|---|
| Rotating Speed (rpm) | | 0 | 100 | 200 | 300 | 500 | 800 | 1000 | 1200 | 500 | 300 | 300 |
| Blades | YES/NO | NO | NO | NO | NO | NO | NO | NO | NO | YES | YES | YES |
|  | Number | — | — | — | — | — | — | — | — | 4 | 16 | 16 |
|  | Shape | — | — | — | — | — | — | — | — | Flat | Flat | Flat |
|  | Misc. | | | | | | | | | | | Fitted with Outer Plate |
| Cooling time (min.) | | 12.0 | 9.3 | 8.0 | 7.0 | 5.6 | 4.0 | 3.8 | 3.7 | 5.0 | 5.2 | 4.8 |
| Necessary Cooling Time in Relation to Prior Art 1 (%) | | 100 | 78 | 67 | 58 | 47 | 33 | 32 | 31 | 42 | 43 | 40 |
| Carcass Cord | In-Process Extensibility (%) | 0.9 | 0.3 | 0.2 | 0.0 | 0.1 | 0.1 | 0.1 | 0.1 | 0.0 | 0.1 | 0.1 |
| Conicity | | 20N | 13N | 8N | 5N | 3N | 4N | 4N | 3N | 2N | −2N | −3N |

TABLE 2

Tire Size: 195/65R15 91S

|  |  | EX. 11 | EX. 12 | EX. 13 |
|---|---|---|---|---|
| Rotating Speed (rpm) | | 500 | 800 | 300 |
| Blades | YES/NO | YES | YES | YES |
|  | Number | 16 | 16 | 16 |
|  | Shape | Flat | Flat | Sweep-Back Wing |
|  | Misc. | Fitted with Outer Plate | Fitted with Outer Plate | Fitted with Outer Plate |
| Cooling Time (min.) | | 4.0 | 3.3 | 5.4 |
| Necessary Cooling Time in Relation to Prior Art 1 (%) | | 33 | 28 | 45 |
| Carcass Cord | In-Process Extensibility (%) | 0.0 | 0.1 | 0.0 |
| Conicity | | 2 N | −2 N | 2 N |

Next, radial tires for four-wheel drive cars having a size of 265/70R16 112S were prepared at a vulcanization cycle time (here, a sum of a vulcanization time and times required to open and close the mold and to carry the tire in and out) of 14 min. These radial tires were expansion-cooled by variously changing the above cooling conditions as shown in TABLE-2. Details of the cooling conditions and the test results are shown for Examples 14 to 17 and Prior Art 2 in TABLE-3.

TABLE 3

Tire Size: 265/70R15 112S

|  |  | Prior Art 2 | EX. 14 | EX. 15 | EX. 16 | EX. 17 |
|---|---|---|---|---|---|---|
| Rotating Speed (rpm) | | 0 | 50 | 100 | 200 | 300 |
| Blades | YES/NO | NO | NO | NO | NO | NO |
|  | Number | — | — | — | — | — |
|  | Shape | — | — | — | — | — |
|  | Misc. | | | | | |
| Cooling Time (min.) | | 24.0 | 22.5 | 18.0 | 12.5 | 10.0 |
| Necessary Cooling Time in Relation to Prior Art 1 (%) | | 100 | 94 | 75 | 52 | 42 |
| Carcass Cord | In-Process Extensibility | 0.9 | 0.8 | 0.4 | 0.4 | 0.3 |
| Conicity | | 38N | 35N | 21N | 18N | 17N |

Next, Grashof numbers $Gr = g\beta\Delta T L_1^3/\nu^2$ and Reynolds numbers $Re = L_2\pi d\omega/\nu$ were calculated. It should be noted that the Grashof number is a dimensionless number used in the study of free convection caused by a hot body.

Here, $g[m/s^2]$: gravitational acceleration, $\beta[1/K]$: volumetric expansion coefficient of air, $\Delta T [K]$: temperature difference between the outer surface of the tire and the ambient air, $L_1[m]$: characteristic length of the natural convection, $\nu[m^2/s]$: kinetic viscosity of air, $L_2[m]$: characteristic length of the forced convection, $d[m]$: tire diameter, $\omega[rps]$: tire rotating speed. It was assumed that $L_1 = d$ and $L_2 = d$ upon calculation.

After the above Grashof number Gr and Reynolds number Re were calculated for each of Examples 1 to 20, $Gr/Re^2 = g\beta\Delta T L_1^3/(\pi^2 T \omega^2 L_2^2 d^2)$ was calculated. Examples 1 to 13 and Examples 14 to 17 were graphically represented in FIG. 16 while being marked as $Gr/Re^2$ 195 and $Gr/Re^2$ 265, respectively. The circumferential speed and conicity of the vulcanized tires 1 used in Examples 1 to 7 were superimposed on the graph of FIG. 16. As reference data, conicities at the rotating speeds of 30, 50 and 80 rpm were also marked. The value of $Gr/Re^2$ is preferably 0.4 or smaller (at a rotating speed of 80 rpm or faster), more preferably 0.25 or smaller (at a rotating speed of 100 rpm or faster), even more preferably 0.05 or smaller (at a rotating speed of 200 rpm or faster) and most preferably 0.025 or smaller (at a rotating speed of 300 rpm or faster).

Figure 16:
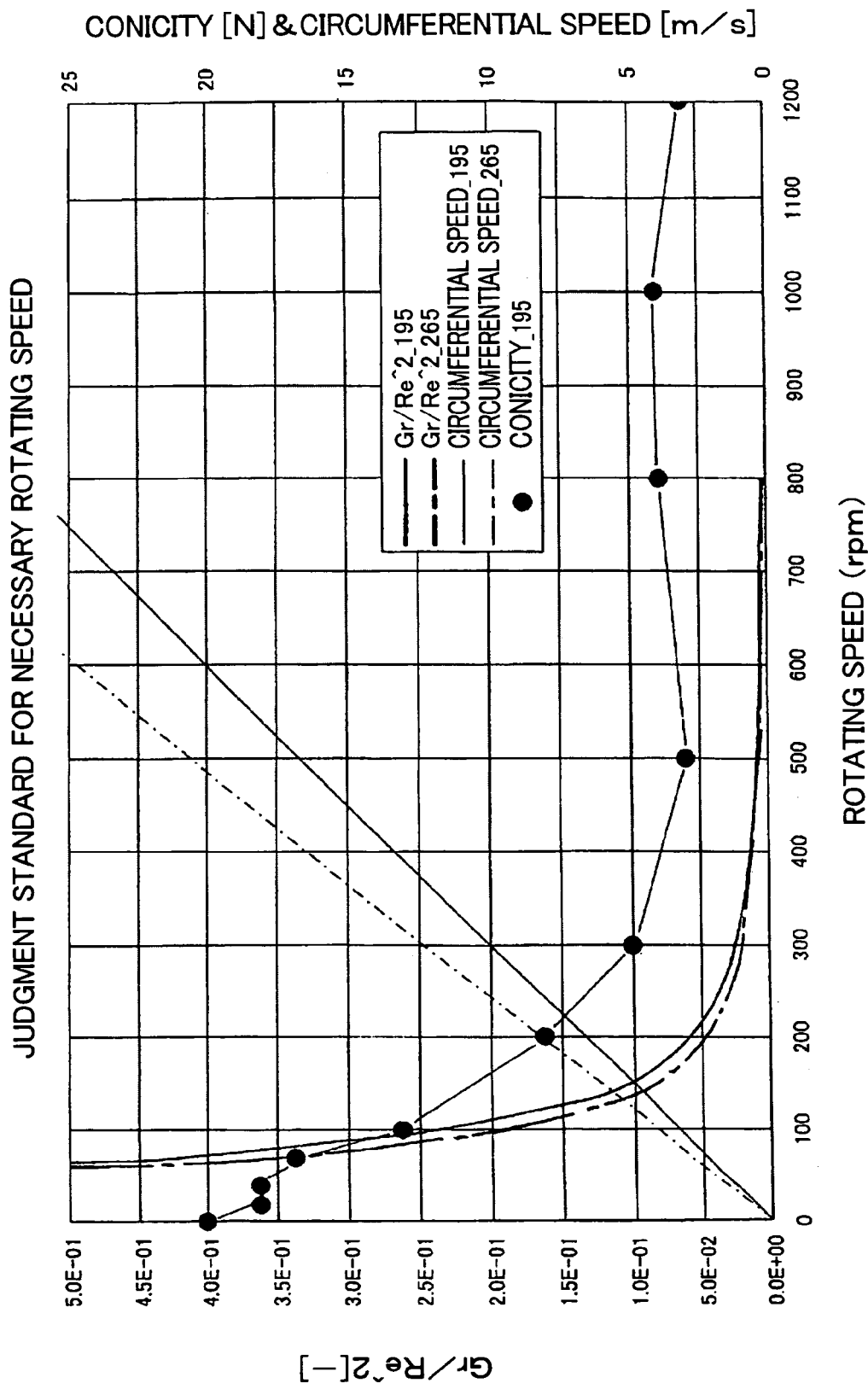
FIG. 16 is a graph showing a judging standard for a necessary rotating speed.

It was elucidated from TABLES 1 to 3 and FIGS. 15 and 16 that the cooling time could be considerably shortened (to 80% or less in Examples) if the rotating speed was 100 rpm or faster. The reason for this is thought to be the high-speed rotation of the vulcanized tire to such an extent that the forced convection became more dominant than the natural convection in the air flow around the vulcanized tire as also shown in the aforementioned simulation results. It was also elucidated that the cooling time could be more shortened in the presence of the blades than in the absence of the blades when the vulcanized tire was rotated at a high speed.

It was further elucidated that the conicity was improved by rotating the vulcanized tire at a high speed. Specifically, it was elucidated that the conicity was improved at the time of expansion cooling at a rotating speed of 100 rpm or faster, suddenly improved at a rotating speed of 200 rpm or faster, and remarkably improved at a rotating speed of 300 rpm or faster. It was also elucidated that the in-process extensibility (maximum/minimum difference (%)) of the carcass cords could be suppressed to 0.5% or lower when the vulcanized tire was expansion-cooled at a high rotating speed of 100 rpm or faster. The reason for this is presumably because the air present around the vulcanized tire flowed in such a state where the forced convection was more dominant than the natural convection and this flow symmetrically occurred at the opposite axial sides with respect to the equator of the tire, whereby the physical property values of the vulcanized tire became symmetric at the opposite axial sides with respect to the equator of the tire.

Next, tires having asymmetric side gauges were prepared as shown in TABLE-4 and expansion-cooled by the above cooling method. Details of the test results are shown in TABLE-4 for Examples 8, 18 and 19. A result obtained by cooling a tire having an asymmetric side gauge using a conventional PCI was written as a comparative example.

TABLE 4

Tire Size: 195/65R15 91S

| | Comp. EX. | EX. 8 | EX. 18 | EX. 19 |
|---|---|---|---|---|
| Side Gauge: Upper | 3.0 | 3.0 | 3.0 | 3.0 |
| Side Gauge: Lower | 5.0 | 3.0 | 5.0 | 5.0 |
| Rotating Speed | 0 | 500 | 500 | 500 |
| Blades Shape | — | Flat | Flat | Flat |
| Number (Upper) | — | 4 | 4 | 4 |
| Number (Lower) | — | 4 | 4 | 8 |
| Cooling Time (min.) | 17.0 | 5.0 | 7.2 | 5.9 |
| Necessary Cooling Time in Relation to Prior Art 1 (%) | 142 | 42 | 60 | 49 |
| Carcass Cord In-Process Extensibility | 1.8 | 0.0 | 1.1 | 0.2 |
| Conicity | 27N | 2N | 12N | 3N |

It became clear from a comparison of Examples 8 and 18 in TABLE-4 that, in the case of cooling the tire having an asymmetric side gauge by means of the apparatus in which the blade members are symmetrically arranged at the upper and lower sides, the extensibility of the carcass cords (maximum/minimum difference %) and the conicity were deteriorated, i.e., became less uniform. On the other hand, it became clear from a comparison of Examples 8, 18 and 19 that these physical properties became more uniform by increasing the number of the blades at a thicker side of the side gauge (lower side of the side gauge) as in Example 19 (four blades in Example 18 and eight blades in Example 19) to promote the cooling of the thicker side gauge.

Since the cooling time can be remarkably shortened than ever before, the expansion cooling can be started without any waiting time after the vulcanization even if the post cure inflator has only one position of treatment to the vulcanizer in order to carry out the process from the holding of the vulcanized tire to the expansion cooling at the same position and in the same posture. Since the vulcanization cycle time was 10 min. and the target cooling temperature was 80° in the experiment using the vulcanized tires whose size was 195/65R15 91S, Examples in which the cooling time to reach the target cooling temperature is 10 min. or shorter (at a rotating speed of 100 rpm or faster) were described. However, it goes without saying that, in the case that a vulcanization cycle time of 10 min. or longer is necessary or the target cooling temperature needs to be slightly higher although the tire size is same, effects similar to the above can be obtained even at a rotating speed slightly slower than 100 rpm.

As described above, an inventive post cure inflator comprises a vulcanized-tire holding mechanism for holding a vulcanized tire, and a rotating mechanism for rotating the vulcanized tire.

Preferably, the rotating mechanism may rotate the vulcanized tire at a high speed via the vulcanized-tire holding mechanism so that a forced convection becomes more dominant than a natural convection in the air flow around the vulcanized tire.

With such a construction, the heat of the vulcanized tire can be more actively removed by the forced convection when the vulcanized tire is rotated at a high speed so that the forced convection becomes more dominant than the natural convection in the air flow around the vulcanized tire. Thus, the vulcanized tire can be cooled to a specified temperature or lower within a short period of time. Further, since the vulcanized tire is symmetrically shaped with respect to the axial center position, the forced convection created by the high-speed rotation of the vulcanized tire is an air flow symmetric at the opposite axial sides with respect to the equator of the vulcanized tire, i.e., the line of intersection of the plane passing the axial center point and normal to the axial direction and normal to the axial direction and the circumferential surface of the vulcanized tire. Thus, the vulcanized tire can be symmetrically cooled at the opposite axial sides with respect to the tire equator, whereby the qualities thereof, particularly uniformity, after the expansion cooling can be improved.

Further, since the vulcanized tire is cooled by the rotation thereof, the running cost for the cooling is not increased and there is no likelihood of increasing the size of the apparatus, complicating the mechanisms and increasing the parts cost as compared to a case where the driving source and the pipe for the cooling are added as have been conventionally done.

In the above construction, the rotating mechanism may preferably rotate the vulcanized tire at a rotating speed of 100 rpm or faster. With such a rotating mechanism, the forced convection can be securely made more dominant than the natural convection in the air flow around the vulcanized tire.

As a more preferable mode, the post cure inflator may comprise a vulcanized-tire holding mechanism for holding the vulcanized tire, a rotating mechanism for rotating the vulcanized tire via the vulcanized-tire holding mechanism and an air remover including an air removing mechanism for forcibly removing the air present near the side surface portions of the vulcanized tire utilizing the rotation of the rotating mechanism.

Specifically, when the side surface portions are moved relative to the ambient still air by the rotation of the vulcanized tire, an air flow distribution in which relative velocity is zero on the outer surfaces of the side surface portions and gradually increases as the distance from the outer surfaces increases, i.e., the so-called hydrodynamic boundary layer is created. With the above construction, the hydrodynamic boundary layers are made even thinner by the air flow induced by the air removing mechanism than when the tire is merely rotated. Similarly, for the temperature field, the thermal boundary layers present near the side surface portions are made thinner. Thermal resistance decreases more as these boundary layers become thinner. The air present near the side surface portions and having reached a high temperature by the heat exchange is forcibly removed by the air removing mechanism, and air before the heat exchange is supplied from the outside to compensate for the removed air. As a result, the vulcanized tire can be cooled to a specified temperature or lower within a shorter period of time than in the case that the vulcanized tire is cooled by being merely rotated. Further, since the cooling of the vulcanized tire is promoted, utilizing its rotation by the rotating mechanism, the running cost for the cooling is not increased and there is no likelihood of increasing the size of the apparatus, complicating the mechanisms and increasing the parts cost as compared to a case where the driving source and the pipe for the cooling are added as have been conventionally done.

As another preferable mode, the air removing mechanism may include blade members provided in the vulcanized-tire holding mechanism for creating the air flow containing components in directions along the side surface portions of the vulcanized tire by rotating with the vulcanized tire holding member. With such an air removing mechanism, the air present near the side surface portions of the vulcanized tire can be removed by a simple construction of providing the blade members in the rim mechanism.

As still another preferable mode, the blade members may be so provided as to satisfy the condition for selectively crating a high-speed air flow at the desired part of the vulcanized tire than other parts.

Since this construction can remove more heat at the desired part than at the other parts by causing the air to flow at a higher speed at the desired part of the vulcanized tire, the cooling can be more focused on the desired part.

As another preferable mode, the air removing mechanism may include a partitioning member for partitioning the first spatial area at the air inflow side toward the blade members and a second spatial area near the side surface portions of the vulcanized tire.

With this construction, when the temperature of the air present in the second spatial area increases due to the heat exchange with the vulcanized tire, a movement of the air having the increased temperature into the first spatial area can be prevented since the second spatial area is partitioned off from the first spatial area by the partitioning member. As a result, only the air before the heat exchange is present in the first spatial area and flows toward the blade members. Therefore, the vulcanized tire can be more efficiently cooled.

As another preferable mode, the air removing mechanism may include a cooling air supplying mechanism for supplying the cooling air to the blade members.

With this construction, the vulcanized tire can be more efficiently cooled since the cooling air is fed to the vulcanized tire.

As another preferable mode, the air removing mechanism may include raking members fixed while being opposed to the side surface portions of the vulcanized tire for raking the air present near the side surface portion.

With this construction, the air present near the side surface portions and having reached a high temperature by the heat exchange with the vulcanized tire can be forcibly removed by being raked by the raking members. Thus, the vulcanized tire can be cooled to a specified temperature or lower within a short period of time.

As another preferable mode, the post cure inflator may comprise an air replacing mechanism for replacing the air for inflation for inflating the vulcanized tire by the inner pressure during the rotation of the vulcanized tire.

With this construction, the vulcanized tire can be more efficiently cooled since it becomes possible to cool the vulcanized tire from the inside by replacing the air for inflation for inflating the vulcanized tire by means of the air replacing means.

Another inventive post cure inflator may comprise a vulcanized-tire holding mechanism for holding a vulcanized tire, a rotating mechanism for rotating the held vulcanized tire, and an air remover including an air removing mechanism opposed to both side surface portions of the vulcanized tire to remove the air present near the side surface portions of the vulcanized tire by forcibly causing it to flow or raking it in cooperation with the rotation of the vulcanized tire.

Still another inventive post cure inflator may be characterized by a vulcanized-tire holding mechanism for holding and rotating the vulcanized tire in the circumferential direction of the vulcanized tire, and an air remover including an air removing mechanism for creating the air flows at the opposite side surface positions of the vulcanized tire by rotating in the circumferential direction of the vulcanized tire, thereby forcibly removing the air present near the side surface portions.

Further another inventive post cure inflator may be characterized by a vulcanized-tire holding mechanism for holding and rotating the vulcanized tire in the circumferential direction of the vulcanized tire, and an air remover including a first air removing mechanism for crating the air flow at one of the side surface portions of the vulcanized tire by rotating in the circumferential direction of the vulcanized tire to forcibly remove the air present near the one side surface portion, and a second air removing mechanism opposed to the other side surface portion for forcibly removing the air present near the other side surface portion of the vulcanized tire in cooperation with the rotation of the vulcanized tire.

With these constructions, the air present near the side surface portions is forcibly removed when the side surface portions are moved relative to the air by the rotation of the vulcanized tire. More specifically, if the air removing mechanisms are so constructed as to forcibly rake the air in cooperation with the rotation of the vulcanized tire, the air present near the side surface portions and having reached a high temperature by the heat exchange is forcibly removed by the air removing mechanisms, and air before the heat exchange is supplied from the outside to compensate for the removed air. As a result, the vulcanized tire can be cooled to a specified temperature or lower within a shorter period of time than in the case of merely rotating the vulcanized tire to cool it. Further, the air flow distribution in which relative velocity is zero on the outer surface of the side surface portion and gradually increases as the distance from the outer surface increases, i.e., the so-called hydrodynamic boundary layer is created on the outer surface of each side surface portion. The hydrodynamic boundary layers are made even thinner by the air flow induced by the air removing mechanism than when the tire is merely rotated. Similarly, for the temperature field, the thermal boundary layers present near the side surface portions are made thinner. Thermal resistance decreases more as these boundary layers become thinner, and heat exchange is quickly carried out. Further, since the cooling of the vulcanized tire is promoted, utilizing its rotation by the rotating mechanism, the running cost for the cooling is not increased and there is no likelihood of increasing the size of the apparatus, complicating the mechanisms and increasing the parts cost as compared to a case where the driving source and the pipe for the cooling are added as have been conventionally done.

In these constructions, the air removing mechanism or the first and second air removing mechanisms may preferably include a plurality of blade members located at even intervals along the circumferential direction of the vulcanized tire.

With such blade members, the side surface portions of the vulcanized tire can be uniformly cooled along the circumferential direction.

Further, the air removing mechanisms or the first and second air removing mechanisms may preferably include raking members fixed while being opposed to the side surface portions of the vulcanized tire for raking the air present near the side surface portions.

With such raking members, the air present near the side surface portions and having reached a high temperature through the heat exchange with the vulcanized tire can be forcibly removed by being raked by the raking members. Thus, the vulcanized tire can be cooled to a specified temperature or lower within a short period of time.

An inventive vulcanized tire cooling method comprises the step of expansion-cooling a vulcanized tire while causing air outside the vulcanized tire to flow in a forced convection.

The vulcanized tire cooling method may be characterized by expansion-cooling a vulcanized tire while causing the air outside the vulcanized tire to flow in such a manner that a forced convection becomes more dominant than a natural convection, so that the physical property values become symmetric at the opposite axial sides with respect to the equator of the vulcanized tire.

According to this method, the vulcanized tire can be expansion-cooled within a short period of time since the vulcanized tire can be actively cooled from the outside by creating the air flow outside the vulcanized tire by the forced convection. Further, the physical property values are made symmetric at the opposite axial sides with respect to the equator of the vulcanized tire by the cooling of this air flow, whereby the qualities of the vulcanized tire such as conicity after the expansion cooling can be improved.

The vulcanized tire cooling method may be characterized by expansion-cooling a vulcanized tire by causing the air outside the vulcanized tire to symmetrically flow in the areas at the opposite axial sides with respect to the equator of the vulcanized tire by the forced convection.

According to this method, the vulcanized tire can be expansion-cooled within a short period of time since the vulcanized tire can be actively cooled from the outside by creating the air flow outside the vulcanized tire. Further, a temperature distribution can be made symmetric at the opposite axial sides of the vulcanized tire by causing the air to symmetrically flow in the areas at the opposite axial sides. Thus, the qualities of the vulcanized tire such as conicity after the expansion cooling can be improved.

According to these methods, the forced convection of the air may be preferably created by rotating the vulcanized tire at a high speed.

According to this method, the air flow can be created at least outside the vulcanized tire to improve the cooling time and the qualities by a relatively simple method of rotating the vulcanized tire at a high speed. If the vulcanized tire is rotated at a high speed in this way, the air present inside the vulcanized tire is also induced to the air flow symmetric at the opposite axial sides. Accordingly, the inner surface temperature distribution becomes symmetric at least at the opposite axial sides, whereby the cooling time can be shortened and the qualities can be improved.

As a more preferable mode of the above method, the vulcanized tire may be rotated at a speed of 100 rpm or faster.

This method can secure the shortening of the cooling time and the improvements in the qualities brought about by the high speed rotation of the vulcanized tire.

Further, if Gr and Re denote the Grashof number and the Reynolds number used to judge the intensity of the natural convection, the value of $Gr/Re^2$ may be 0.4 or smaller.

According to this method, the carcass members (e.g., made of polyester) as reinforcing fibers can be prevented from heat contraction after the cooling, which can reduce differences in the physical property values between the opposite axial sides with respect to the equator of the tire. As a result, uniformity can be improved.

The inventive vulcanized tire may be expansion-cooled by any one of the above vulcanized tire cooling methods.

Such a vulcanized tire can enjoy high tire qualities since being cooled according to the above cooling methods.

The inventive post cure inflator may comprise a tire holding mechanism for holding a vulcanized tire, and an air removing mechanism for causing the air outside the vulcanized tire to flow in such a manner that a forced convection becomes more dominant than a natural convection, so that the physical property values become symmetric at the opposite axial sides with respect to the equator of the vulcanized tire.

With this construction, the vulcanized tire can be expansion-cooled within a short period of time since the vulcanized tire can be actively cooled from the outside by creating the air flow outside the vulcanized tire. Further, since the temperature distribution symmetric at the opposite axial sides of the vulcanized tire can be attained by causing the air to symmetrically flow in the areas at the opposite axial sides, the qualities of the vulcanized tire such as conicity after the expansion cooling can be improved.

As another preferable mode, the air removing mechanism may include a rotating mechanism for rotating the vulcanized tire at a high speed of 100 rpm or faster via the vulcanized-tire holding mechanism.

With this construction, the air flow by the forced convection can be created outside the vulcanized tire by rotating the horizontally placed vulcanized tire at a high speed of 100 rpm or faster. Thus, the air flow can be created at least outside the vulcanized tire to shorten the cooling time and improve the qualities by a relatively simple method of rotating the vulcanized tire at a high speed. By rotating the vulcanized tire at a high speed in this way, the air inside the vulcanized tire can be induced to the air flow symmetric at the opposite axial sides. Accordingly, the inner surface temperature distribution symmetric at least at the opposite axial sides can be attained, therefore the cooling time can be shortened and the qualities can be improved.

As another preferable mode, the air removing mechanism may include a blade members for agitating the air.

With this construction, the vulcanized tire can be sufficiently cooled to such a temperature at which the vulcanized tire undergoes no thermal shrinkage.

As another preferable mode, the post cure inflator may be of a fixed cooling position type which has only one handling position, so that the process from the holding of the vulcanized tire by the vulcanized-tire holding mechanism to the expansion cooling is carried out at the same position and in the same posture.

With this construction, since the equipment can be more simply constructed, mechanical precision can be improved and precision in positioning and holding the vulcanized tire can be improved, with the result that the qualities of the tire can be further improved through, for example, an improvement of the tire uniformity. Further, the reliability of the equipment is increased and the frequency and cost of short interruptions and maintenance can be reduced.

The inventive post cure inflator may be the one for expansion-cooling the vulcanized tire carried out from the vulcanizer for vulcanizing the green tire while holding it and characterized by a vulcanized-tire holding mechanism installed at the specified position for holding the vulcanized tire and a rotating mechanism for rotating the vulcanized tire at such a high speed as to cool the vulcanized tire to a specified temperature or lower within a vulcanization time in the vulcanizer. The vulcanized-tire holding mechanism has only one handling position, so that the process from the holding of the vulcanized tire to the expansion cooling is carried out at the same position and in the same posture.

With this construction, since the vulcanized tire can be securely cooled within one vulcanization cycle time for vulcanizing the green tire in the vulcanizer to obtain the vulcanized tire, the next vulcanized tire can be set in the vulcanized-tire holding mechanism to start the expansion cooling without any waiting time after the vulcanization even if only one vulcanized-tire holding mechanism per mold is installed at the specified position. Further, since the number of the vulcanized-tire holding mechanisms can be reduced to the necessary minimum number, the construction of the post cure inflator can be simplified and the parts cost and the assembling cost can be reduced. Further, since the equipment can be more simply constructed, mechanical precision can be improved and precision in positioning and holding the vulcanized tire can be improved, with the result that the qualities of the tire can be further improved through, for example, an improvement of the tire uniformity. Further, the reliability of the equipment is increased and the frequency and cost of short interruptions and maintenance can be reduced.

As another preferable mode, the rotating mechanism may rotate the vulcanized tire at a high speed to cause the air outside the vulcanized tire to flow such that the forced convection becomes more dominant than the natural convection.

With this construction, since the vulcanized tire can be quickly cooled by the forced convection created by the high-speed rotation of the vulcanized tire, the cooling time in the vulcanized-tire holding mechanism can be securely set within the vulcanization time in the vulcanizer.

As another preferable mode, the specified temperature may be 80° C. at a side wall portion adjacent to a tread portion, i.e., at a side wall portion from a steel belt edge to a bead wire.

With this construction, the deformation of the vulcanized tire due to the contraction of the reinforcing fibers can be securely prevented.

As still another preferable mode, the rotating mechanism may rotate the vulcanized tire at a high speed of 100 rpm or faster.

With this construction, the cooling rate of the vulcanized tire can be remarkably increased by the high-speed rotation of 100 rpm or faster, and the air flow can be created at least outside the vulcanized tire by the relatively simple method of rotating the vulcanized tire at a high speed, thereby shortening the cooling time and improving the qualities.

As another preferable mode, the blade members may be provided to agitate the air around the vulcanized tire.

With this construction, the cooling rate of the vulcanized tire can be further increased.

As another preferable mode, the blade members may be set to have the shape of sweep-back wings.

With this construction, the cooling rate of the vulcanized tire can be increased even more.

This application is based on patent application Nos. 2004-327584, 2004-327585, and 2004-327586 filed in Japan, the contents of which are hereby incorporated by references.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A post cure inflator, comprising:
    a vulcanized-tire holding mechanism for holding a vulcanized tire;
    a rotating mechanism for rotating the vulcanized tire; and
    an air remover for causing, over a side surface portion of the rotating vulcanized tire, an air flow different from an air flow caused by rotating the vulcanized tire to remove the air present near the side surface portion of the rotating vulcanized tire.

2. A post cure inflator according to claim 1, wherein the rotating mechanism rotates the vulcanized tire at such a speed via the vulcanized-tire holding mechanism that a forced convection becomes more dominant than a natural convection in an air flow around the vulcanized tire.

3. A post cure inflator according to claim 2, wherein the rotating mechanism includes means for rotating the vulcanized tire at a speed of 100 rpm or faster.

4. A post cure inflator according to claim 2, wherein the air remover includes a removing member operatively connected to the rotating mechanism.

5. A post cure inflator according to claim 2, further comprising an air replacing mechanism for replacing air for inflation for inflating the vulcanized tire by an inner pressure during the rotation of the vulcanized tire.

6. A post cure inflator according to claim 1, wherein the rotating mechanism includes means for rotating the vulcanized tire at such a speed as to cool the vulcanized tire to a specified temperature or lower within a vulcanization time in a vulcanizer; and
    the vulcanized-tire holding mechanism is installed at a specified position for holding the vulcanized tire, and has only one handling position so that the process from the holding of the vulcanized tire by the vulcanized-tire holding mechanism to the expansion cooling is carried out at the same position and in the same posture.

7. A post cure inflator according to claim 6, the rotating mechanism rotates the vulcanized tire at such a speed as to cause air outside the vulcanized tire to flow such that a forced convection becomes more dominant than a natural convection.

8. A post cure inflator according to claim 6, wherein the specified temperature is 80° C. at a side wall portion adjacent to a tread portion.

9. A post cure inflator according to claim 6, wherein the rotating mechanism includes means for rotating the vulcanized tire at a speed of 100 rpm or faster.

10. A post cure inflator comprising:
    a vulcanized-tire holding mechanism for holding a vulcanized tire;
    a rotating mechanism for rotating the vulcanized tire, wherein the rotating mechanism rotates the vulcanized tire at a high speed via the vulcanized-tire holding mechanism so that a forced convection becomes more dominant than a natural convection in an air flow around the vulcanized tire; and
    an air removing mechanism for forcibly removing the air present near side surface portions of the vulcanized tire utilizing the rotation by the rotating mechanism, wherein the air removing mechanism includes a blade member provided in the vulcanized-tire holding mechanism for creating an air flow at the side surface portions by rotating together with the vulcanized-tire holding mechanism.

11. A post cure inflator according to claim 10, wherein the blade member is so arranged as to satisfy a condition for selectively creating a faster air flow at a desired part of the vulcanized tire than other parts.

12. A post cure inflator according to claim 10, wherein the air removing mechanism includes a cooling air supplying mechanism for supplying cooling air to the blade member.

13. A post cure inflator according to claim 10, wherein the air removing mechanism includes a partitioning member for partitioning a first spatial area at an air inflow side toward the blade member and a second spatial area near the side surface portions of the vulcanized tire.

14. A post cure inflator comprising:
a vulcanized-tire holding mechanism for holding a vulcanized tire;
a rotating mechanism for rotating the vulcanized tire, wherein the rotating mechanism rotates the vulcanized tire at a high speed via the vulcanized-tire holding mechanism so that a forced convection becomes more dominant than a natural convection in an air flow around the vulcanized tire; and
an air removing mechanism for forcibly removing the air present near side surface portions of the vulcanized tire utilizing the rotation by the rotating mechanism,
wherein the air removing mechanism includes a raking member fixed while being opposed to the side surface portions of the vulcanized tire for raking the air present near the side surface portions.

15. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes a plurality of blade members located at even intervals along the circumferential direction of the vulcanized tire.

16. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes a raking member fixed while being opposed to the side surface portion of the vulcanized tire for raking the air present near the side surface portion of the vulcanized tire.

17. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes air removing mechanisms opposed to both side surface portions of the vulcanized tire to remove air present near the side surface portions of the vulcanized tire by forcibly causing the air to flow or raking the air in cooperation with the rotation of the vulcanized tire.

18. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes air removing mechanisms rotatable in the circumferential direction of the vulcanized tire to create air flows at both side surface portions of the vulcanized tire, thereby forcibly removing air present near the side surface portions.

19. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes:
a first air removing mechanism rotatable in the circumferential direction of the vulcanized tire to create an air flow at one side surface portion of the vulcanized tire, thereby forcibly removing air present near the one side surface portion; and
a second air removing mechanism opposed to the other side surface portion for forcibly removing air present near the other side surface portion of the vulcanized tire in cooperation with the rotation of the vulcanized tire.

20. A post cure inflator comprising:
a vulcanized-tire holding mechanism for holding a vulcanized tire;
a rotating mechanism for rotating the vulcanized tire; and
an air remover for removing air present near a side surface portion of the vulcanized tire,
wherein the air remover includes:
first air removing mechanisms rotatable in the circumferential direction of the vulcanized tire to create air flows from bead sides toward the opposite side surface portions of the vulcanized tire; and
second air removing mechanisms opposed to the opposite side surface portions of the vulcanized tire to forcibly remove the air present near the side surface portions of the vulcanized tire in cooperation with the rotation of the vulcanized tire.

21. A post cure inflator comprising:
a vulcanized-tire holding mechanism for holding a vulcanized tire; and
a rotating mechanism for rotating the vulcanized tire, wherein the post cure inflator expansion-cools the vulcanized tire carried out from a vulcanizer for vulcanizing a green tire while holding the vulcanized tire;
the rotating mechanism rotates the vulcanized tire at such a speed as to cool the vulcanized tire to a specified temperature or lower within a vulcanization time in the vulcanizer; and
the vulcanized-tire holding mechanism is installed at a specified position for holding the vulcanized tire, and has only one handling position so that the process from the holding of the vulcanized tire by the vulcanized-tire holding mechanism to the expansion cooling is carried out at the same position and in the same posture,
further comprising a blade member for agitating air around the vulcanized tire.

22. A post cure inflator comprising:
a vulcanized-tire holding mechanism for holding a vulcanized tire; and
a rotating mechanism for rotating the vulcanized tire, wherein the post cure inflator expansion-cools the vulcanized tire carried out from a vulcanizer for vulcanizing a green tire while holding the vulcanized tire;

the rotating mechanism rotates the vulcanized tire at such a speed as to cool the vulcanized tire to a specified temperature or lower within a vulcanization time in the vulcanizer; and the vulcanized-tire holding mechanism is installed at a specified position for holding the vulcanized tire, and has only one handling position so that the process from the holding of the vulcanized tire by the vulcanized-tire holding mechanism to the expansion cooling is carried out at the same position and in the same posture, further comprising a blade member for agitating air, wherein the blade member is set to have the shape of a sweep-back wing.

23. A post cure inflator, comprising:

a vulcanized-tire holding mechanism for holding a vulcanized tire;

a rotating mechanism for rotating the vulcanized tire at such a speed as to cause air outside the vulcanized tire to flow in such a manner that a forced convection becomes more dominant than a natural convection, so that physical property values become symmetric at the opposite axial sides with respect to the equator of the vulcanized tire; and an air remover for causing, over a side surface portion of the rotating vulcanized tire, an air flow different from an air flow caused by rotating the vulcanized tire to remove the air present near the side surface portion of the rotating vulcanized tire.

24. A post cure inflator according to claim 23, wherein the air removing mechanism includes a rotating mechanism for rotating the vulcanized tire at a high speed of 100 rpm or faster via the vulcanized-tire holding mechanism.

25. A post cure inflator comprising:

a vulcanized-tire holding mechanism for holding a vulcanized tire, and an air removing mechanism for causing air outside the vulcanized tire to flow in such a manner that a forced convection becomes more dominant than a natural convection, so that physical property values become symmetric at the opposite axial sides with respect to the equator of the vulcanized tire, wherein the air removing mechanism includes a blade member for agitating the air.

26. A vulcanized tire cooling method comprising the step of:

mounting a vulcanized tire on a vulcanized tire holder;

rotating the vulcanized tire at such a speed as to cause a forced convection of the air outside the tire;

removing the air outside the vulcanized tire by causing an air flow different from the forced air convection caused by rotating the vulcanized tire; and expansion-cooling the vulcanized tire.

27. A vulcanized tire cooling method according to claim 26, wherein the vulcanized tire is rotated at a speed of 100 rpm or faster.

28. A vulcanized tire cooling method according to claim 26, wherein the air is caused to symmetrically flow by the forced convection in areas at the opposite axial sides with respect to the tire equator outside the vulcanized tire.

29. A vulcanized tire cooling method according to claim 26, wherein the air outside the vulcanized tire is caused to flow in such a manner that a forced convection becomes more dominant than a natural convection so that physical property values become symmetric at the opposite axial sides with respect to the equator of the vulcanized tire.

30. A vulcanized tire cooling method according to claim 29, wherein the value of $Gr/Re^2$ is 0.4 or smaller when Gr and Re denote a Grashof number and a Reynolds number used to judge the intensity of the natural convection.

* * * * *

UNITED STATES PATENT AND TRADEMARK OFFICE
CERTIFICATE OF CORRECTION

PATENT NO. : 7,311,872 B2  Page 1 of 1
APPLICATION NO. : 11/258194
DATED : December 25, 2007
INVENTOR(S) : Hisashi Mitamura et al.

It is certified that error appears in the above-identified patent and that said Letters Patent is hereby corrected as shown below:

On the title page, Item (73), the Assignee information is incorrect. Item (73) should read as follows:

-- (73) Assignee: Kabushiki Kaisha Kobe Seiko Sho (Kobe Steel, Ltd.), Kobe-shi (JP); Sumitomo Rubber Industries, Ltd., Kobe-shi (JP) --

Signed and Sealed this

Twenty-ninth Day of April, 2008

JON W. DUDAS
*Director of the United States Patent and Trademark Office*